US010794327B2

(12) United States Patent
Guerinot et al.

(10) Patent No.: US 10,794,327 B2
(45) Date of Patent: Oct. 6, 2020

(54) SYSTEMS AND METHODS FOR THRUST REVERSER WITH TEMPERATURE AND FLUID MANAGEMENT

(71) Applicant: HONEYWELL INTERNATIONAL INC., Morris Plains, NJ (US)

(72) Inventors: Alexandre Guerinot, Phoenix, AZ (US); Justin C. Mickelsen, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 303 days.

(21) Appl. No.: 15/927,542

(22) Filed: Mar. 21, 2018

(65) Prior Publication Data

US 2019/0293023 A1    Sep. 26, 2019

(51) Int. Cl.
*F02K 1/76*    (2006.01)
*F02C 7/18*    (2006.01)
(Continued)

(52) U.S. Cl.
CPC ............ *F02K 1/763* (2013.01); *F02C 7/18* (2013.01); *F02K 1/605* (2013.01); *F02K 1/72* (2013.01);
(Continued)

(58) Field of Classification Search
CPC ..... F02K 1/70; F02K 1/72; F02K 1/62; F02K 1/625; F02K 1/76; F02K 1/763; F01D 21/003; F01D 21/12
See application file for complete search history.

(56) References Cited

U.S. PATENT DOCUMENTS 5,284,012 A    2/1994 Laborie et al.
5,813,218 A    9/1998 Kohlbacher
(Continued)

FOREIGN PATENT DOCUMENTS

EP    2857666 B1    6/2017

OTHER PUBLICATIONS

Mickelsen, Justin C. and William H. Doddman, "Integral Live-Hinge Composite Panel," IP.com Electronic Publication, Apr. 10, 2014.
(Continued)

*Primary Examiner* — Andrew H Nguyen
(74) *Attorney, Agent, or Firm* — Lorenz & Kopf, LLP

(57) ABSTRACT

A thrust reverser system for a gas turbine engine includes a transcowl movable between a stowed position, a deployed position and a partially deployed position between the stowed position and the deployed position by at least one actuator. The system includes a temperature sensor and at least one resistance sensor. The thrust reverser system includes a controller, having a processor, that: outputs one or more control signals to move the transcowl to the partially deployed position; determines whether a temperature associated with the transcowl exceeds a temperature threshold; outputs one or more control signals to move the transcowl from the partially deployed position to the stowed position; determines whether the transcowl has encountered resistance; and based on the determination, outputs one or more control signals to stop a movement of the transcowl and outputs the one or more control signals to move the transcowl to the partially deployed position.

18 Claims, 16 Drawing Sheets

(51) Int. Cl.
*F02K 1/72* (2006.01)
*F02K 1/60* (2006.01)

(52) U.S. Cl.
CPC .......... *F02K 1/76* (2013.01); *F05D 2260/602* (2013.01); *F05D 2260/605* (2013.01); *F05D 2270/303* (2013.01); *F05D 2270/309* (2013.01); *F05D 2270/3032* (2013.01); *F05D 2270/821* (2013.01)

(56) References Cited

U.S. PATENT DOCUMENTS

| | | |
|---|---|---|
| 8,650,855 B2 | 2/2014 | Maalioune |
| 8,657,234 B2 | 2/2014 | Guillaume et al. |
| 8,991,191 B2 | 3/2015 | Diaz et al. |
| 9,670,798 B2 | 6/2017 | Vauchel et al. |
| 9,708,073 B2 | 7/2017 | Pretty et al. |
| 2006/0162338 A1 | 7/2006 | Prociw et al. |
| 2010/0168982 A1* | 7/2010 | Maalioune ................ F02K 1/72 701/100 |
| 2011/0050277 A1 | 3/2011 | Maalioune |
| 2013/0313337 A1* | 11/2013 | Bol ........................ F02K 1/763 239/11 |
| 2015/0369171 A1 | 12/2015 | Papa et al. |
| 2016/0047274 A1 | 2/2016 | Woolworth et al. |
| 2016/0305370 A1 | 10/2016 | Smith et al. |
| 2017/0074211 A1 | 3/2017 | Smith et al. |
| 2017/0122128 A1 | 5/2017 | Lacko |
| 2017/0145956 A1 | 5/2017 | Miller et al. |
| 2017/0184025 A1 | 6/2017 | Sawyers-Abbott |
| 2017/0204808 A1 | 7/2017 | Smith et al. |
| 2017/0204809 A1 | 7/2017 | Smith et al. |
| 2017/0211510 A1 | 7/2017 | Smith et al. |
| 2017/0211511 A1 | 7/2017 | Smith et al. |
| 2017/0226961 A1 | 8/2017 | Smith et al. |
| 2017/0342942 A1* | 11/2017 | Smith .................. G01M 15/14 |
| 2018/0051653 A1 | 2/2018 | Smith et al. |

OTHER PUBLICATIONS

Mickelsen, Justin C., et al., "Integrated Elevated Temperature and Fire Event Management in Aerospace Applications Utilizing Adaptive, Thermo-sensitive Mechanisms with Temperature Excursion Detectability while Improving Aerodynamic Efficiency," IP.com No. IPCOM000245892D, Apr. 18, 2016.

* cited by examiner

SYSTEMS AND METHODS FOR THRUST REVERSER WITH TEMPERATURE AND FLUID MANAGEMENT

TECHNICAL FIELD

The present disclosure generally relates to gas turbine engines, and more particularly relates to systems and methods for a thrust reverser with temperature and fluid management for a gas turbine engine.

BACKGROUND

Generally, gas turbine engines on most jet-powered aircraft include thrust reverser systems. Thrust reverser systems enhance the stopping power of the aircraft by redirecting turbine engine exhaust flow in order to generate reverse thrust. Typically, thrust reverser systems have two distinct operating states: a forward (or stowed) state, in which the thrust reverser system forms a portion of a gas turbine engine nacelle and forward thrust nozzle; and a reverse (or deployed) state, in which the thrust reverser system forms a reverse flow path through which it redirects at least a portion of the gas turbine engine airflow forward and radially outward, to help decelerate the aircraft.

After landing, when the aircraft is on the ground, the heat generated while the gas turbine engine was running may be stored in various engine components. When the gas turbine engine shuts down, this heat is still present within the gas turbine engine as the gas turbine engine is no longer creating bypass cooling flow. In certain instances, the air temperatures of the convective gases rising off the hot engine components may provide the hottest conditions for a thrust reverser and adjacent components due to the absence of the bypass cooling flow forcing and entraining air to exit the engine through the exhaust nozzle.

In addition, generally a majority of engine components have drainage requirements in order to prevent corrosion that may result from pooling of fluids, such as one or more liquid substances. In certain instances, thrust reversers may encounter fluids, such as condensation or weather related fluids, such as rain water, which may need to be drained from the thrust reverser to prevent corrosion.

Accordingly, it is desirable to provide systems and methods for a thrust reverser having temperature and fluid management. In this regard, it is desirable to provide a thrust reverser with one or more vents that enable the hot fluids from the gas turbine engine and engine components to vent to the ambient surroundings upon landing. It is also desirable to provide a control system for a thrust reverser that enables the thrust reverser to at least partially move to the reverse (or deployed state) to enable the hot gases from the gas turbine engine and engine components to vent to the ambient surroundings after engine shutdown and to drain fluids associated with the gas turbine engine. Further, it is also desirable to provide a thrust reverser with one or more drains that enable fluids associated with the gas turbine engine and/or operating conditions of the gas turbine engine to drain from the gas turbine engine. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a thrust reverser system for a gas turbine engine. The thrust reverser system includes at least one hinge coupled to the thrust reverser system so as to be adjacent to at least one opening defined in the thrust reverser system. The thrust reverser system includes at least one body coupled to the at least one hinge. The at least one body has a first body end and an opposing second body end. The body pivotally coupled to the hinge such that a portion of the body is positionable within the at least one opening and the body includes at least one counterweight at the first body end or the second body end. The body is positioned within the at least one opening based on an operating condition of the gas turbine engine.

Further provided is a thrust reverser system for a gas turbine engine. The thrust reverser system includes at least one frame coupled to at least one opening defined in the thrust reverser system. The at least one frame defines at least one aperture. The thrust reverser system includes at least one sealing member coupled to the at least one frame. The at least one sealing member is movable between a first, closed position in which the at least one sealing member covers the at least one aperture and a second, open position in which the at least one sealing member is spaced apart from the at least one aperture based on an operating condition of the gas turbine engine.

Also provided according to various embodiments is a thrust reverser system for a gas turbine engine. The thrust reverser system includes a transcowl movable between a first, stowed position and a second, deployed position. The transcowl has an outer surface and an opposing inner surface. The transcowl defines at least one opening that extends through the transcowl from an outer surface to an inner surface. The thrust reverser system includes a frame including an outer support frame connected to an inner support frame by at least one spoke to define at least one aperture between the inner support frame and the outer support frame. The thrust reverser system includes a diaphragm coupled to the frame. The diaphragm movable between a first, closed position in which the diaphragm covers the at least one aperture and a second, open position in which the diaphragm is spaced apart from the at least one aperture based on an operating condition of the gas turbine engine.

Further provided according to various embodiments is a thrust reverser system for a gas turbine engine. The thrust reverser system includes a transcowl movable between a first, stowed position, a second, deployed position and a partially deployed position between the first, stowed position and the second, deployed position by at least one actuator. In the partially deployed position, the transcowl defines at least one opening. The thrust reverser system includes a temperature sensor that observes a temperature associated with the thrust reverser system and generates temperature sensor signals based on the observation. The thrust reverser system includes at least one resistance sensor that observes a displacement of the transcowl and generates resistance sensor signals based on the observation. The thrust reverser system includes a controller, having a processor, that: outputs one or more control signals to the at least one actuator to move the transcowl to the partially deployed position; receives and processes the temperature sensor signals to determine whether a temperature associated with the transcowl exceeds a temperature threshold; based on the determination that the temperature is below the temperature threshold, outputs one or more control signals to the at least one actuator to move the transcowl from the partially deployed position to the first, stowed position; receives and processes the resistance sensor signals from the at least one resistance sensor to determine whether the transcowl has encountered resistance; and based on the determination that the transcowl has encountered resistance, outputs one or more control signals to the at least one actuator to stop a movement of the transcowl and outputs the one or more control signals to move the transcowl to the partially deployed position.

Also provided is a thrust reverser system for a gas turbine engine. The thrust reverser system includes a transcowl movable between a first, stowed position, a second, deployed position and a partially deployed position between the first, stowed position and the second, deployed position by at least one actuator. In the partially deployed position, the transcowl defines at least one opening. The thrust reverser system includes a source of a user input that is a command to start-up the gas turbine engine and at least one resistance sensor that observes a displacement of the transcowl and generates resistance sensor signals based on the observation. The thrust reverser system includes a controller, having a processor, that: outputs one or more control signals to the at least one actuator to move the transcowl to the partially deployed position; receives the user input, and based on the user input, outputs one or more control signals to the at least one actuator to move the transcowl to the first, stowed position; receives and processes the resistance sensor signals from the at least one resistance sensor to determine whether the transcowl has encountered resistance; and based on the determination that the transcowl has encountered resistance, outputs one or more control signals to the at least one actuator to stop a movement of the transcowl and outputs the one or more control signals to move the transcowl to the partially deployed position.

Also provided according to various embodiments is a method for temperature and fluid management for a gas turbine engine having a thrust reverser. The method includes outputting, by a processor, one or more control signals to at least one actuator associated with a transcowl to move the transcowl to a partially deployed position. The transcowl is movable between a first, stowed position, a second, deployed position and the partially deployed position between the first, stowed position and the second, deployed position by the at least one actuator. In the partially deployed position, the transcowl defines at least one opening. The method includes receiving, by the processor, temperature sensor signals from a temperature sensor that observes a temperature associated with the thrust reverser system. The method includes determining, by the processor, based on the temperature sensor signals whether a temperature associated with the transcowl exceeds a temperature threshold. The method includes based on the determination that the temperature is below the temperature threshold, outputting, by the processor, one or more control signals to the at least one actuator to move the transcowl from the partially deployed position to the first, stowed position. The method includes receiving, by the processor, resistance sensor signals from at least one resistance sensor that observes a displacement of the transcowl and determining, by the processor, based on the resistance sensor signals whether the transcowl has encountered resistance. The method includes based on the determination that the transcowl has encountered resistance, outputting, by the processor, one or more control signals to the at least one actuator to stop a movement of the transcowl and outputting, by the processor, the one or more control signals to move the transcowl to the partially deployed position.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
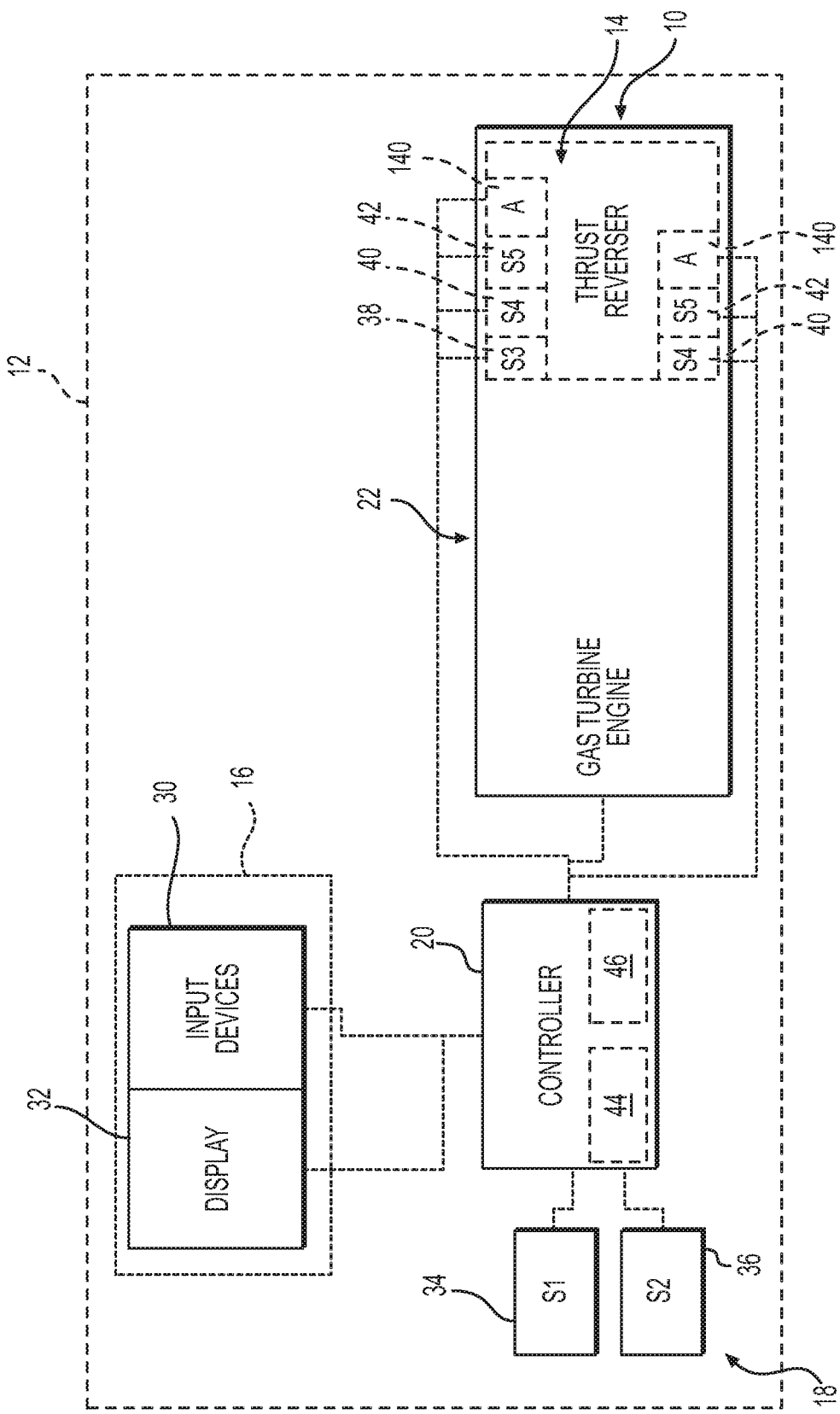
FIG. 1 is a functional block diagram illustrating a mobile platform, such as an aircraft, that includes a gas turbine engine having an exemplary thrust reverser system with temperature and fluid management in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from venting hot fluids from a substantially enclosed structure, such as gases, and that the thrust reverser system described herein for use with a gas turbine engine is merely one exemplary embodiment according to the present disclosure. Further, those skilled in the art will appreciate that embodiments of the present disclosure may be practiced in conjunction with any type of device that would benefit from draining fluids from a substantially enclosed structure, such as liquids, and that the thrust reverser system described herein for use with a gas turbine engine is merely one exemplary embodiment according to the present disclosure. Moreover, while the systems and methods are described herein as being used with a thrust reverser system of a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the mobile platform or aircraft systems described herein is merely an exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

With reference to FIG. 1, a thrust reverser system 10 with temperature and fluid management is associated with a mobile platform, such as an aircraft 12, in accordance with various embodiments. In general, the thrust reverser system 10 includes a thrust reverser assembly 14, a human-machine interface 16, one or more sensors 18 and a controller 20. In this example, the thrust reverser system 10 is associated with a gas turbine engine 22 of the aircraft 12. As will be discussed, in accordance with various embodiments, the thrust reverser system 10 manages a temperature within the gas turbine engine 22 upon a shut-down of the gas turbine engine 22. Moreover, in accordance with various embodiments, the thrust reverser system 10 manages an accumulation of fluids within a portion of the gas turbine engine 22 by providing a drain.

Figure 2:
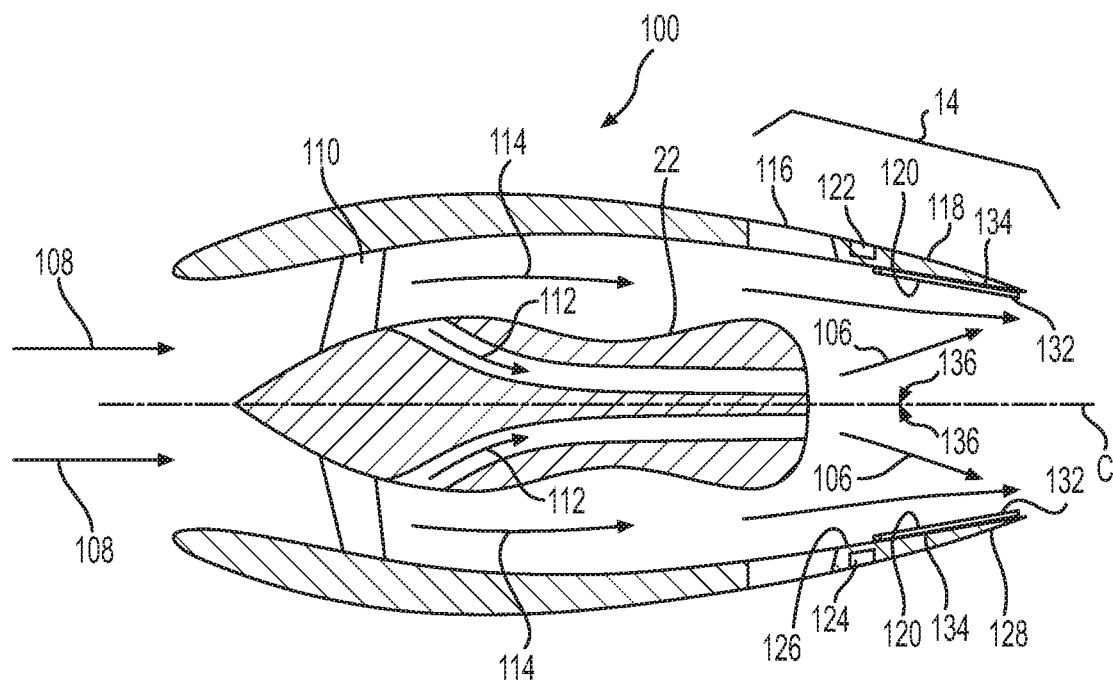
FIG. 2 is a schematic cross-sectional view of the gas turbine engine having the thrust reverser system of FIG. 1, with a transcowl of the thrust reverser system in the first, stowed position.
Figure 3:
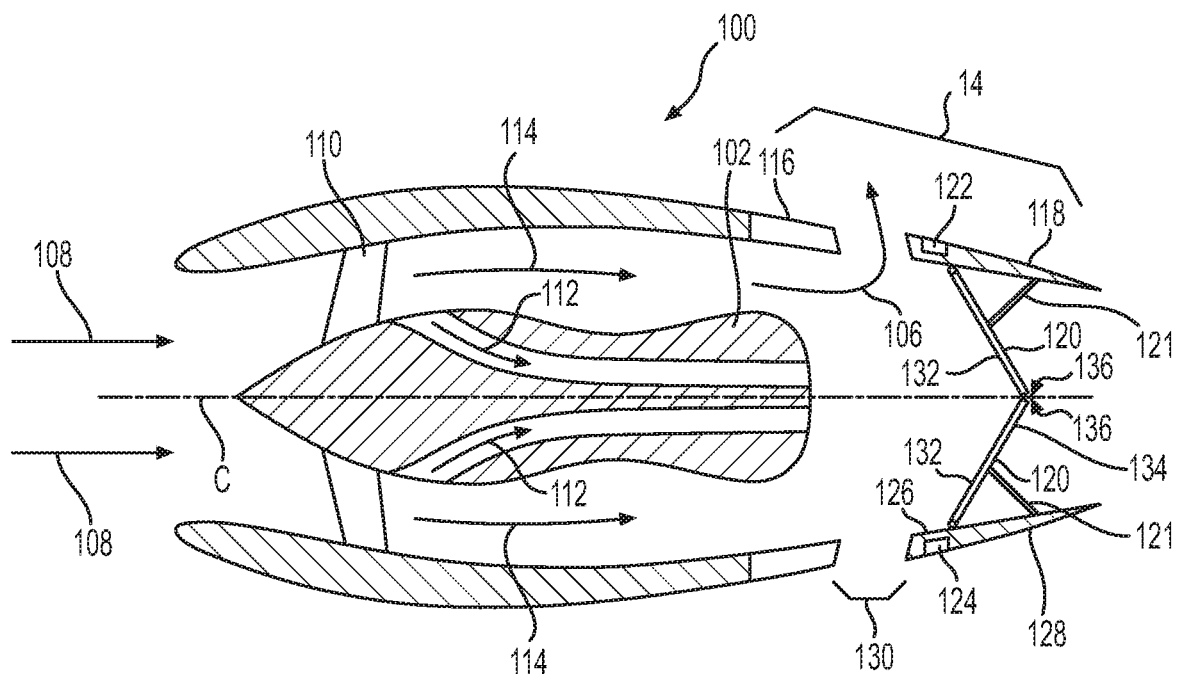
FIG. 3 is a schematic cross-sectional view of the gas turbine engine having the thrust reverser system of FIG. 1, with the transcowl of the thrust reverser system in the second, deployed position.

With reference to FIG. 2, the thrust reverser assembly 14 is shown coupled to the gas turbine engine 22. Generally, FIG. 2 provides a simplified cross-section view of the gas turbine engine 22 with thrust reverser assembly 14 in a first, stowed position. Generally, FIG. 3 provides a simplified cross-section view of the gas turbine engine 22 with thrust reverser assembly 14 in a second, deployed position. The gas turbine engine 22 is a component of an aircraft's propulsion system that typically generates thrust by means of an accelerating mass of gas. Generally, the gas turbine engine 22 is substantially encased within an aerodynamically smooth outer covering, such as a nacelle 100. The nacelle 100 substantially surrounds the gas turbine engine 22 and forms an aerodynamically shaped cavity around a centerline C of the gas turbine engine 22, thereby providing a flow path for engine exhaust flow 106 when the aircraft 12 is generating forward thrust. Generally, ambient air 108 enters the gas turbine engine 22 and passes through a fan 110. A portion of this air is received within a core of the gas turbine engine 22 where it is pressurized by one or more compressors associated with the gas turbine engine 22, and mixed with fuel and ignited within a combustion chamber associated with the gas turbine engine 22. The combustion of the pressurized air and fuel generates combustion products or hot gases known as core flow 112. The remainder of the air from the fan 110 bypasses the core of the gas turbine engine 22 and is known as fan flow 114. Together, the core flow 112 and the fan flow 114 mix downstream to form the engine exhaust flow 106 that is discharged from the gas turbine engine 22, generating forward thrust.

Figure 4:
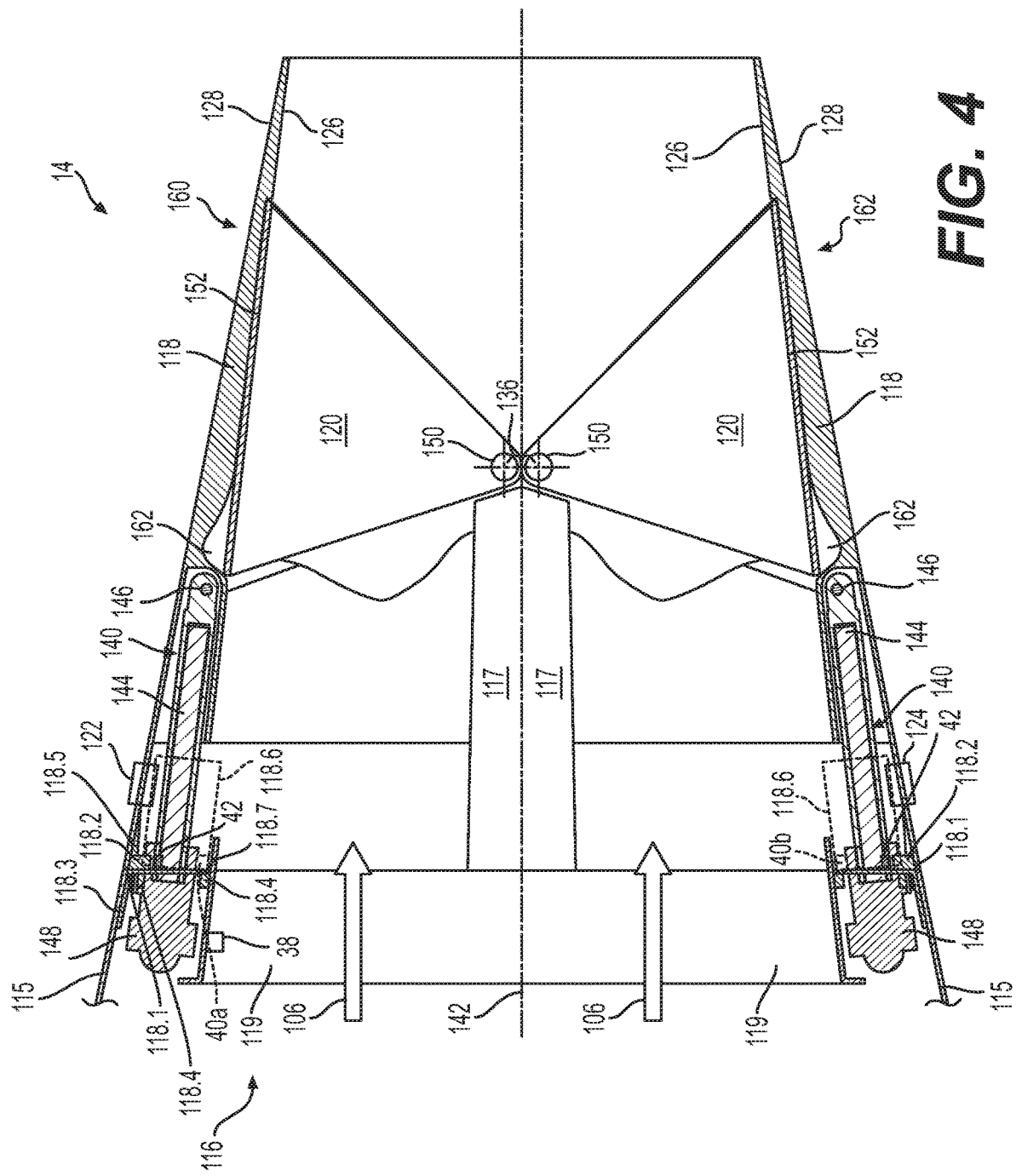
FIG. 4 is a cross-sectional detail view of a thrust reverser assembly of the thrust reverser system of FIG. 1, in which the transcowl of the thrust reverser assembly is in the first, stowed position.

The thrust reverser assembly 14 is coupled to the nacelle 100. With reference to FIG. 4, the thrust reverser assembly 14 includes a stationary support structure 116, an annular translatable cowl, or transcowl 118, and one or more doors 120 (two in the depicted embodiment). It should be noted that while the thrust reverser assembly 14 is described herein as including an annular translatable cowl or transcowl, the various teachings of the present disclosure may be applicable to other types of thrust reverser systems. For example, the various teachings of the present disclosure may be employed with a pivoting-door thrust reverser assembly. In various embodiments, the thrust reverser assembly 14 also includes additional components known in the art, including, but not limited to, a transcowl seal 118.2, a transcowl seal retainer 118.3, an actuator seal 118.4, a transcowl seal striker 118.5, a vane array 118.6, a lock, one or more access panels and one or more sealing gaskets that surround the one or more access panels. For clarity, the various components, including the transcowl seal 118.2, the transcowl seal retainer 118.3, the actuator seal 118.4, the transcowl seal striker 118.5, the vane array 118.6, the lock, the one or more access panels and the one or more sealing gaskets, are not shown in detail herein. As the transcowl seal 118.2, the transcowl seal retainer 118.3, the actuator seal 118.4, the transcowl seal striker 118.5, the vane array 118.6, the lock, the one or more access panels and the one or more sealing gaskets are generally known in the art, the transcowl seal 118.2, the transcowl seal retainer 118.3, the actuator seal 118.4, the transcowl seal striker 118.5, the vane array 118.6, the lock, the one or more access panels and the one or more sealing gaskets will not be described in detail herein. Briefly, the transcowl seal 118.2 is coupled to the transcowl seal retainer 118.3, and the transcowl seal retainer 118.3 is coupled to the support structure 116 to support the transcowl seal 118.2. The transcowl seal 118.2 extends annularly about the support structure 116 so as to be between the support structure 116 and a leading edge 118.1 of the transcowl 118. In the first, stowed position, the transcowl seal 118.2 is in contact with the support structure 116 to provide a seal between the transcowl 118 and the support structure 116. The transcowl seal striker 118.5 contacts and compresses the transcowl seal 118.2 outboard when the transcowl 118 is in the first, stowed position to ensure an effective seal between the leading edge 118.1 and a fan cowl door 115 disposed over and connected to a portion of the support structure 116. In this example, a wall 118.7 interconnects the fan cowl door 115 to an annular front flange 119 of the support structure 116. The one or more access panels provide access to the various components of the thrust reverser assembly 14, and the one or more sealing gaskets inhibit the flow of fluids into and out of the one or more access panels.

In various embodiments, the thrust reverser assembly 14 includes one or more vents 122 and/or one or more drains 124. The support structure 116 has an annular shape and may include associated support beams 117 and an annular front flange 119 that cooperate to provide a rigid structure. In one example, the support beams 117 are coupled to the front flange 119 and extend aft axially therefrom. The support beams 117 slidably engage with the transcowl 118. The support structure 116 couples the thrust reverser assembly 14 to the gas turbine engine 22. In this example, the transcowl 118 is coupled to the support structure 116 and has an inner surface 126 and an outer surface 128. The transcowl 118 is axially translatable, relative to the support structure 116, between a first, stowed position, which is the position depicted in FIG. 2, and a second, deployed position, which is the position depicted in FIG. 3. In the first, stowed position, the leading edge 118.1 of the transcowl 118 (FIG. 4) abuts the fan cowl door 115 disposed over the support structure 116, and in the second, deployed position, the leading edge 118.1 of the transcowl 118 is displaced from the fan cowl door 115 and the support structure 116 (FIG. 5) to form an aperture 130 between the transcowl 118 and the support structure 116. Generally, the leading edge 118.1 of the transcowl 118 is flush with the fan cowl door 115 in the first, stowed position. As will be discussed, the one or more vents 122 and/or the one or more drains 124 may be defined through the transcowl 118 from the outer surface 128 to the inner surface 126 adjacent to, near or spaced a distance apart from the leading edge 118.1 (FIG. 4).

Figure 5:
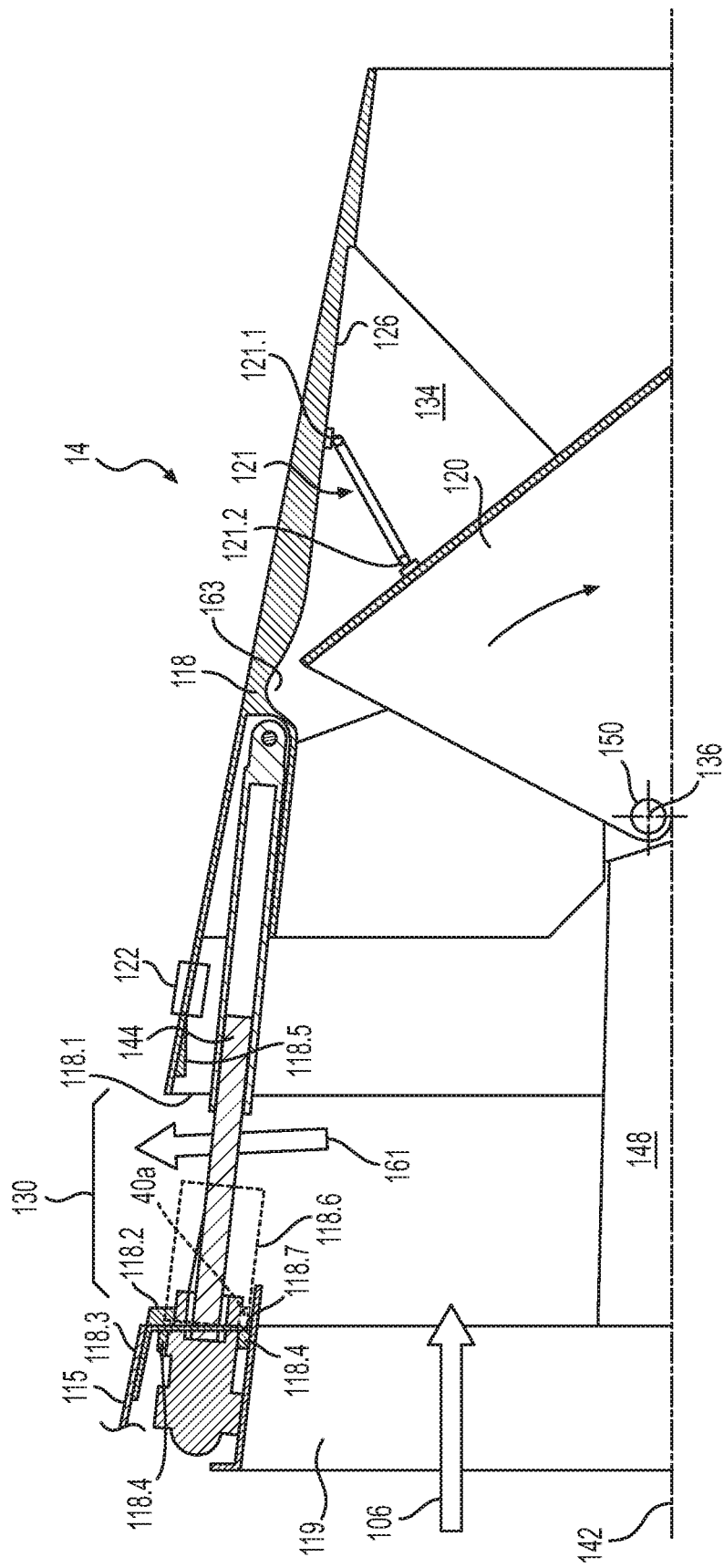
FIG. 5 is a partial cross-sectional detail view of a thrust reverser assembly of the thrust reverser system of FIG. 1, in which the transcowl of the thrust reverser assembly is in the second, deployed position.

Each of the one or more doors 120 includes an inner surface 132 and an outer surface 134, and is pivotally coupled to the support structure 116. In addition, with reference to FIG. 5, each door 120 includes a drag link 121. In one example, the drag link 121 has a first end 121.1 and an opposite second end 121.2. The first end 121.1 is coupled to an inner surface 126 of the transcowl 118. The second end 121.2 is coupled to the door 120. Each door 120 is rotatable, about a pivot axis 136, between a first position (FIG. 2) and a second position (FIG. 3). Generally, each door 120 is rotatable, about the pivot axis 136, between the first position and the second position when the transcowl 118 translates between the first, stowed position and the second, deployed position, respectively. In this regard, as the transcowl 118 translates, the first end 121.1 of the drag links 121, which is coupled to the transcowl 118, moves with the transcowl 118, which causes the second end 121.2 of the drag links 121 to rotate the door from the first position to the second position (FIG. 5). As will be discussed, at least one actuator 140 is in communication with the controller 20 (FIG. 1) and responsive to one or more control signals to move the transcowl 118 between the first, stowed position and the second, deployed position, and thus, move each of the doors 120 between the first position and the second position via the drag links 121. In addition, as will be discussed, the at least one actuator 140 is in communication with the controller 20 (FIG. 1) and responsive to one or more control signals to move the transcowl 118 to a third, partially deployed position (FIG. 15) between the first, stowed position and the second, deployed position to enable temperature and fluid management, while also providing idle thrust management. In the following example, the transcowl 118 includes at least two actuators 140, however, it will be understood that any number of actuators 140 may be employed. Each door 120 is configured, when it is in the second position (FIG. 2), to redirect at least a portion of the engine exhaust flow 106 through the aperture 130. Generally, the door 120 has a clamshell shape and is machined or manufactured to have a shape that permits it to be substantially continuous with the inner surface 132 of the transcowl 118 while stowed, minimizing interference with engine exhaust flow 106. In FIG. 4, the door 120 is shown with edge 152 substantially continuous with the inner surface 126 of the transcowl 118.

With reference to FIGS. 4 and 5, the thrust reverser assembly 14 is shown in greater detail. In FIG. 4, the transcowl 118 is in the first position and in FIG. 5, the transcowl 118 is in the second position (FIG. 5 is a partial cross sectional view, above a thrust reverser centerline 142, of the thrust reverser assembly 14). As shown in FIGS. 4 and 5, the actuators 140 are responsive to one or more control signals received from the controller 20 (FIG. 1) to move or translate the transcowl 118 between the first position (FIG. 4) and the second position (FIG. 5), thereby pivoting each of the doors 120 between the first, stowed position (FIG. 4) and the second, deployed position (FIG. 5). In one example, the actuators 140 are each an electric linear actuator, which is responsive to the one or more control signals to extend or retract a respective shaft 144 coupled to the transcowl 118 by a respective pin 146. In the example of an electric linear actuator, the actuators 140 each include a motor 148 at a first end that is responsive to the one or more control signals from the controller 20 (FIG. 1) to drive a lead screw and a lead nut, which in turn, causes a linear displacement of the shaft 144. The linear displacement of the shafts 144 causes a corresponding linear displacement of the transcowl 118. It should be noted that the use of a leadscrew or ball screw electric linear actuator is merely an example, as one or more hydraulic actuators or pneumatic actuators may be employed and responsive to one or more control signals from the controller 20 (FIG. 1). In one example, the door 120 is pivotally mounted to the support beam 117 at a pivot joint 150 to allow the door 120 to pivot about the pivot axis 136 based on the movement of the transcowl 118 by the actuators 140. The pivot joint 150 may be any fastener or fastening assembly capable of enabling the door 120 to pivot relative to the transcowl 118.

With reference to FIG. 5, the transcowl 118 is in the second, deployed position, and the door 120 has pivoted about the pivot axis 136 to the second position. As shown, in order to move the transcowl 118 to the second, deployed position, and thus, the door 120 to the second position, the shafts 144 of the actuators 140 have moved from a first state (FIG. 4) to a second state (FIG. 5). In the second state, the shafts 144 are extended, such that the transcowl 118 is in the second, deployed position and the door 120 is in the second position. With the door 120 in the second positon, the engine exhaust flow 106 is directed radially outward through the aperture 130, creating a reverse flow path 161. As the door 120 pivots about the pivot axis 136, the door 120 follows a path that is provided by the translation of the rigid drag links 121 by the transcowl 118. In addition, the inner surface 132 is shaped with a contoured area 163 to provide clearance of the door 120 as it pivots on the pivot axis 136 provided by pivot joint 150.

With reference to FIG. 4, the one or more vents 122 and/or the one or more drains 124 are defined through the transcowl 118 from the outer surface 128 to the inner surface 126. It should be noted that while the one or more vents 122 and/or the one or more drains 124 are discussed herein as being employed with a transcowl 118 of the thrust reverser assembly 14, the one or more vents 122 and/or the one or more drains 124 may be employed with a fixed structure, such as a nozzle, to enable the venting of hot gases and/or the draining of fluids from the nozzle. Thus, the use of the one or more vents 122 and/or the one or more drains 124 with the transcowl 118 is merely an example. Generally, the one or more vents 122 are defined along an upper surface 160 (FIG. 4) of the transcowl 118, while the one or more drains 124 are defined along a lower surface 162 (FIG. 6) of the transcowl 118, with the lower surface 162 opposite the upper surface 160. The one or more vents 122 enable hot gases to exit from the gas turbine engine 22 through the transcowl 118 in the instances where the transcowl 118 is closed, such as after a shutdown of the gas turbine engine 22. The one or more drains 124 enable fluids, such as condensation or other liquids, to exit the gas turbine engine 22 via the transcowl 118.

Figure 6:
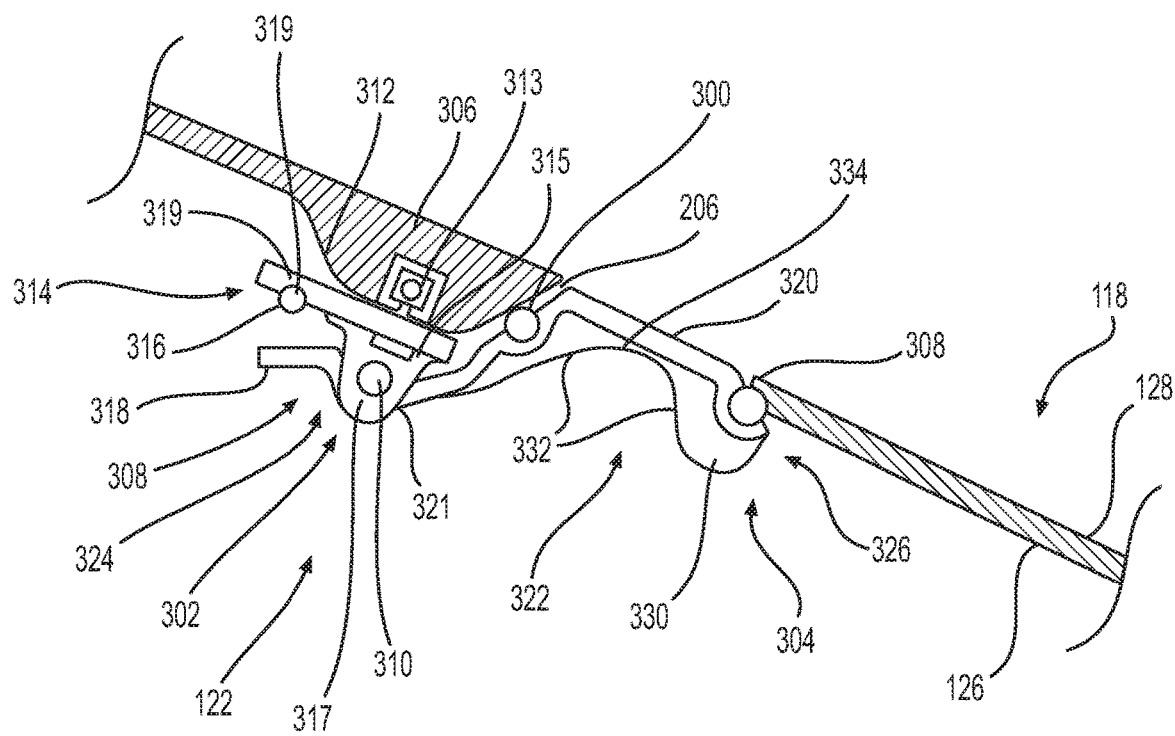
FIG. 6 is a side view of an exemplary vent for use with the thrust reverser system of FIG. 1, with the vent in the first, closed position.

In one example, with reference to FIG. 6, an exemplary one of the vents 122 is shown. It should be noted that while a single vent 122 is shown, the transcowl 118 may include any number of vents 122 defined through the upper surface 160 of the transcowl 118 (FIG. 4), and moreover, if a number of vents 122 are employed, the vents 122 may be arranged in any desired pattern to provide suitable venting of hot gases from the gas turbine engine 22. In addition, it should be noted that the size of the vent 122 shown in FIG. 6 is merely exemplary, as the vent 122 may have any desired size to enable venting of the hot gases from the gas turbine engine 22 and/or the transcowl 118 based on a size of the gas turbine engine 22, for example. In one example, the vent 122 may have a diameter from about 10% to about 50% of a diameter of a nozzle exit area of an exhaust nozzle of the gas turbine engine 22. It should be noted that a plurality of vents 122 may be employed such that sum of the diameters of the vents 122 is about 10% to about 50% of the diameter of the nozzle exit area of the exhaust nozzle of the gas turbine engine 22.

Figure 7:
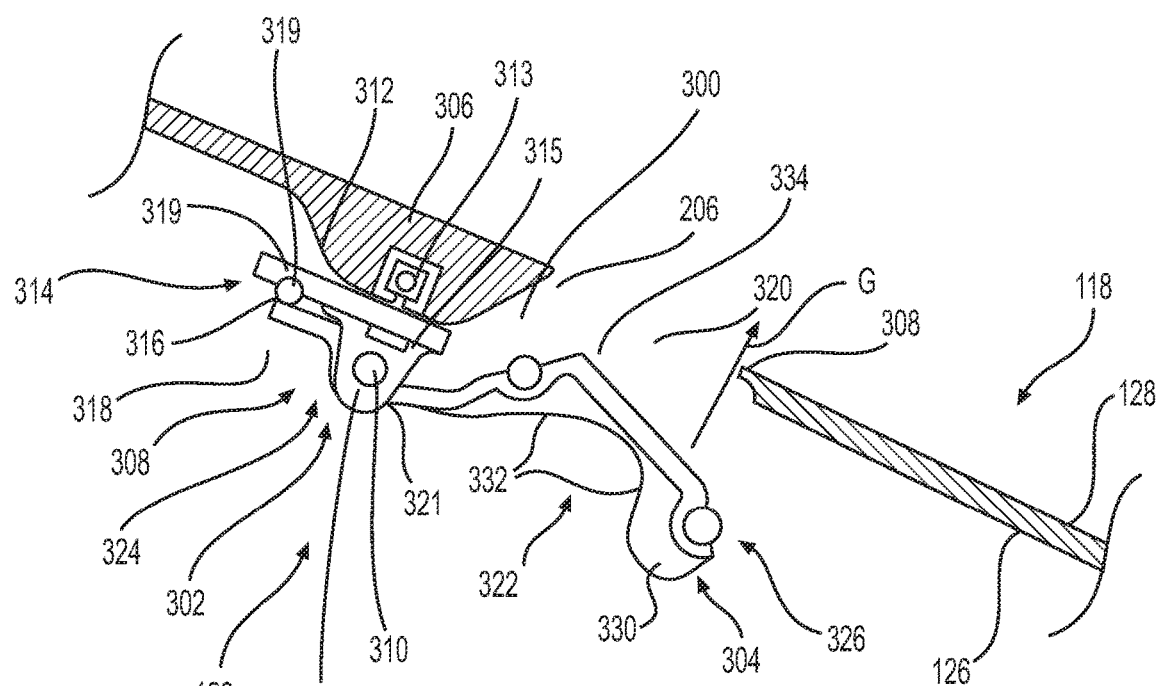
FIG. 7 is a side view of the vent of FIG. 6, with the vent in the second, open position.

In this example, the vent 122 includes a seal 300, a hinge 302 and a body 304. The vent 122 is coupled to an annular rib 306 defined on the inner surface 126 of the transcowl 118 so as to be in communication with an opening 206 defined through the transcowl 118 from the outer surface 128 to the inner surface 126. In one example, a width of the opening 206 is greater than about 0.125 inches (in.), and in this example, the width of the opening 206 is about 1.0 inches (in.) to about 1.5 inches (in.) in diameter. It should be noted that the vent 122 need not be coupled to an annular rib, but may be coupled to a locally thickened area of the transcowl 118, if desired. As will be discussed, the vent 122 is movable, based on an operating condition of the gas turbine engine, such as an operating pressure, between a first, closed position (FIG. 6) and a second, opened position (FIG. 7). The seal 300 surrounds the opening 206 and cooperates with the body 304 to prevent or inhibit the ingress and/or egress of fluids when the vent 122 is in the first, closed position. It should be noted that "fluids" encompasses both liquids and gases, such as water, air, etc. In one example, the seal 300 is an elastomeric seal, such as an O-ring; however, any suitable seal may be employed. In one example, the seal 300 is coupled to the transcowl 118 about the opening 206, however, the seal 300 may be coupled directly to the body 304 of the vent 122, if desired.

The hinge 302 movably or pivotally couples the body 304 to the transcowl 118. In one example, the hinge 302 includes a hinge flange 308 and a hinge pin 310. In one example, the hinge flange 308 is substantially U-shaped or substantially clevis-shaped, and includes a first side 312 opposite a second side 314. The hinge flange 308 may be composed of a metal, metal alloy or polymer, and may be formed via casting, stamping, injection molding, forging, additive manufacturing, etc. The first side 312 is coupled to the rib 306 of the inner surface 126. The first side 312 may be coupled to the inner surface 126 via any suitable technique, including, but not limited to, mechanical fasteners, rivets, adhesives, welding, etc. In this example, the first side 312 is coupled to the rib 306 via a mechanical fastener assembly 313. In one example, a nut of the mechanical fastener assembly 313 is fixedly coupled to or integrally formed with the rib 306, and a bolt of the mechanical fastener assembly 313 is received through a bore defined through the hinge flange 308 to fixedly couple the hinge flange 308 to the rib 306.

The second side 314 includes a pair of flanges 315 and a first stop feature 316. The pair of flanges 315 are spaced apart along the second side 314 to define the substantially U-shape or substantially clevis-shape of the hinge flange 308. Each flange of the pair of flanges 315 extends outwardly from the second side 314 and defines a bore 317 for receipt of the hinge pin 310. In certain embodiments, the pair of flanges 315 cooperates to form a clevis fastener, which couples the body 304 to the transcowl 118. The hinge pin 310 is received through each of the bores 317 and through a portion of the body 304 to pivotally couple the body 304 to the hinge 302. The hinge pin 310 is substantially cylindrical, and may be composed of a metal or metal alloy. The hinge pin 310 may be formed via casting, extrusion, etc.

The first stop feature 316 is defined on the second side 314 so as to be spaced apart from the pair of flanges 315. The first stop feature 316 cooperates with a second stop feature 318 defined on the body 304 to limit a range of travel of the body 304 and to soften an impact between the body 304 and the hinge 302. In one example, the first stop feature 316 is a cylindrical piece of elastomeric material, which is received within a recess 319 defined within the second side 314. Alternatively, the first stop feature 316 may comprise a number of cylindrical pieces of elastomeric material, which may be inserted into a respective one of a plurality of bores defined through the hinge 302 in a substantially perpendicular direction. It should be noted that the first stop feature 316 is not limited to a cylindrical piece of elastomeric material, but the first stop feature 316 may comprise any suitable structure that limits a range of motion of the body 304.

The body 304 includes a first body side 320 opposite a second body side 322, and a first body end 324 opposite a second body end 326. The body 304 may be composed of a metal, metal alloy or polymer, and may be formed via casting, stamping, injection molding, forging, additive manufacturing, etc. In one example, the body 304 is integrally formed or a one-piece monolithic component. The first body side 320 is substantially flat or planar, and is sized and shaped to be received within the opening 206 and to cooperate with the seal 300 to prevent the ingress and/or egress of fluids when the vent 122 is in the first, closed position. Generally, the first body side 320 is sized to be received within the opening 206 such that the first body side 320 is flush with the outer surface 128 of the transcowl 118. In one example, the body 304 is circular to be received within the opening 206, which is circular; however, the body 304 may have any desired shape to correspond with a particular shape of the opening 206.

The second body side 322 defines a counterweight 330, one or more stiffening features 332 and the second stop feature 318. The counterweight 330 is sized such that upon a decrease in pressure within the transcowl 118 (due to the gas turbine engine 22 not operating), the counterweight 330 moves the vent 122 from the first, closed position to the second, open position; and that upon an increase in pressure within the transcowl 118 (due to the gas turbine engine 22 operating), the vent 122 is moved from the second, open position to the first, closed position. In one example, the counterweight has a mass of about 0.2 pounds (lbs.) when the first body side 320 has a surface area of about 4 square inches (sq. in.) and the pressure change (delta) is about 0.5 pounds per square inch (psi). The counterweight 330 is defined on the second body side 322 so as to be at or near the second body end 326. In addition, it should be noted depending on the placement of the hinge 302, for example, at about 20% to about 25% of a chord location on the body 304, a weight of the body 304 itself may cause the vent 122 to move from the second, open position upon a decrease in pressure within the transcowl 118. Moreover, in other examples, a live hinge may be employed instead of the counterweight 330. An exemplary live hinge for coupling to the body 304 of the vent 122 is described in the document entitled "Integral Live-Hinge Composite Panel," by Justin Mickelsen et al., published Apr. 10, 2014, the relevant portion of which is incorporated herein by reference in its entirety.

The one or more stiffening features 322 provide rigidity to the body 304. In one example, the body 304 includes two stiffening features 322, which are spaced apart along the second body side 322. In this example, one of the stiffening features 322 is adjacent to the counterweight 330, and the other of the stiffening features 332 is between the one of the stiffening features 332 and the first body end 324. A recess 334 may be defined between the stiffening features 332 to provide a mass savings to the body 304. The second stop feature 318 is defined at the first body end 324. In one example, the second stop feature 318 comprises a tab, which contacts the first stop feature 316 to prevent a further rotation of the body 304. It should be noted that the second stop feature 318 may be configured in a variety of ways, and the tab shown herein is merely exemplary. Spaced apart from the second stop feature 318 at the first body end 324 is a throughbore 321, which receives the hinge pin 310 to couple the body 304 to the pair of flanges 315 of the hinge flange 308. In this example, the throughbore 321 is spaced apart from the first body end 324 to enable the second stop feature 318 to contact the first stop feature 316.

In one example, in order to couple the vent 122 to the transcowl 118, with the opening 206 defined in the transcowl 118, the seal 300 may be coupled about the opening 206. With the hinge flange 308 and the body 304 formed, the body 304 is coupled to the hinge flange 308 via the hinge pin 310. The hinge flange 308 is fixedly coupled to the rib 306 of the inner surface 126 by the mechanical fastener assembly 313 so as to be adjacent to the opening 206 such that the first body side 322 is received within the opening 206. With the vent 122 coupled to the transcowl 118, during operation of the gas turbine engine 22, the internal operating pressure of the gas turbine engine 22 received within the transcowl 118 is sufficient to maintain the vent 122 in the first, closed position. Generally, the vent 122 remains in the first, closed position for an internal operating pressure that is about equal to or greater than about 0.1 pounds per square inch gauge (psig). Thus, when the internal pressure within the gas turbine engine 22 is greater than atmospheric pressure (14.7 pounds per square inch (psi.)), the vent 122 remains in the first, closed position. Once the gas turbine engine 22 ceases to operate, the internal pressure within the transcowl 118 decreases and trends towards ambient or atmospheric pressure. As the pressure within the transcowl 118 decreases, the force of gravity acting on the counterweight 330 of the body 304 causes the body 304 to rotate about the hinge 302 to move the vent 122 into the second, open position, as shown in FIG. 7. In the second, open position, the first body side 322 is spaced apart from the opening 206 to enable the hot gases from the gas turbine engine 22 to be released or vented into the ambient surroundings. Generally, in the second, open position, the hot gases within the gas turbine engine 22 and/or the transcowl 118 are released from the gas turbine engine 22 into the ambient surroundings through the vent 122, thereby reducing temperatures experienced by the components associated with the gas turbine engine 22 upon shutdown.

Figure 8:
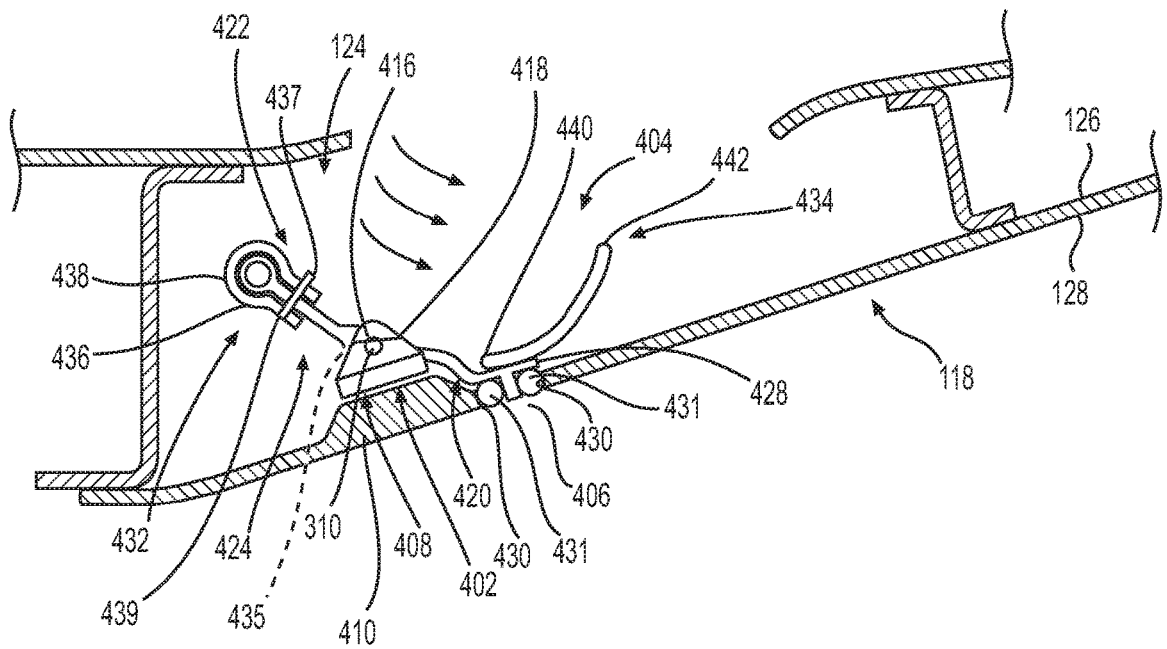
FIG. 8 is a side view of an exemplary drain for use with the thrust reverser system of FIG. 1, with the drain in the first, closed position.

In one example, with reference to FIG. 8, an exemplary one of the drains 124 is shown. It should be noted that while a single drain 124 is shown, the transcowl 118 may include any number of drains 124 defined through the lower surface 162 of the transcowl 118 (FIG. 4), and moreover, if a number of drains 124 are employed, the drains 124 may be arranged in any desired pattern to provide suitable draining of fluids from the gas turbine engine 22. In addition, it should be noted that the size of the drain 124 shown in FIG. 8 is merely exemplary, as the drain 124 may have any desired size to enable fluids to drain from the gas turbine engine 22 based on a size of the gas turbine engine 22, for example.

Figure 9:
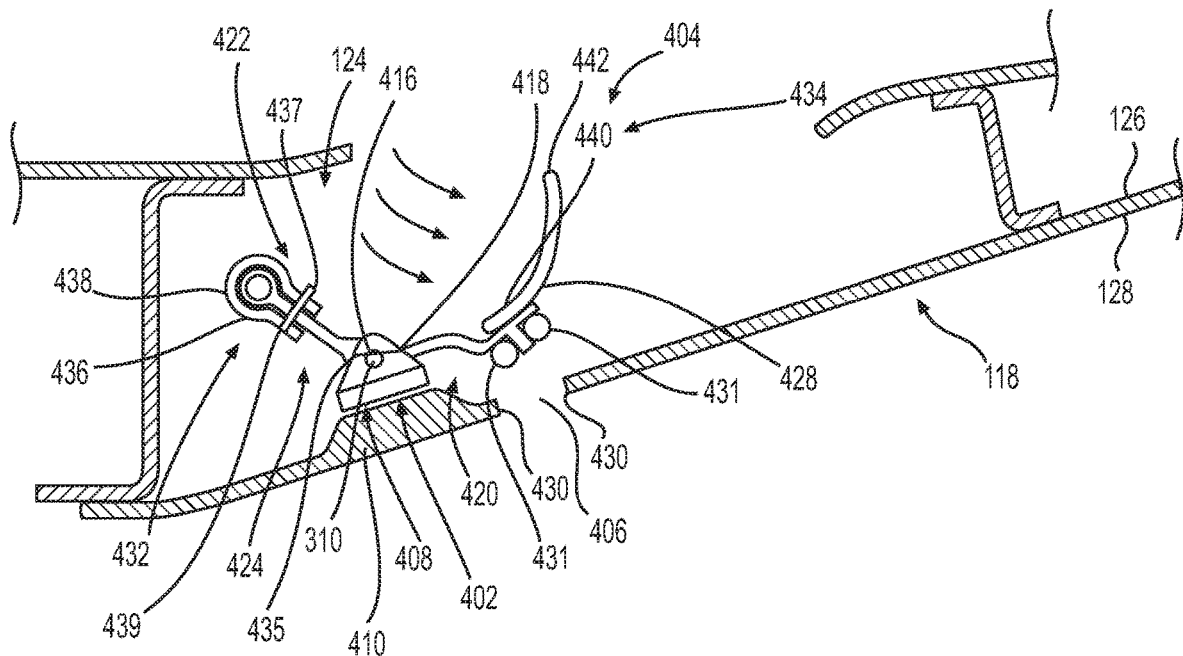
FIG. 9 is a side view of the drain of FIG. 8, with the drain in the second, open position.

In this example, the drain 124 includes a hinge 402 and a body 404. The drain 124 is coupled to the inner surface 126 of the transcowl 118 along the lower surface 162 (FIG. 4) so as to be in communication with an opening 406 defined through the transcowl 118 from the outer surface 128 to the inner surface 126. In one example, a diameter of the opening 406 is greater than about 0.125 inches (in.), and in this example, the opening 406 is about 0.25 inches (in.) in diameter. It should be understood, however, that the opening 406 may have any desired size and shape, such as square, rectangular, etc. Generally, a portion of the body 404 is sized and shaped to cooperate with the size and shape of the opening 406 to ensure that the opening 406 is sealed during the operation of the gas turbine engine 22. As will be discussed, the drain 124 is movable, based on an operating condition of the gas turbine engine 22, such as a fluid flow, between a first, closed position (FIG. 8) and a second, opened position (FIG. 9). As the drain 124 includes components that are substantially similar to or the same as the vent 122 discussed with regard to FIGS. 1-7, the same reference numerals will be used to denote the same or similar features.

The hinge 402 movably or pivotally couples the body 404 to the transcowl 118. In one example, the hinge 402 includes a hinge flange 408 and the hinge pin 310. In one example, the hinge flange 408 is substantially U-shaped, and includes a first side 412 opposite a second side 414. The hinge flange 408 may be composed of a metal, metal alloy or polymer, and may be formed via casting, stamping, injection molding, forging, additive manufacturing, etc. The first side 412 is coupled to an annular rib 410 defined on the inner surface 126. The first side 412 may be coupled to the rib 410 of the inner surface 126 via any suitable technique, including, but not limited to, mechanical fasteners, rivets, adhesives, welding, etc. The second side 414 includes a pair of flanges 416. The pair of flanges 416 are spaced apart along the second side 214 to define the substantially U-shape of the hinge flange 308. Each flange of the pair of flanges 416 extends outwardly from the second side 414 and defines a bore 418 for receipt of the hinge pin 310. The hinge pin 310 is received through each of the bores 418 and through a portion of the body 404 to pivotally couple the body 404 to the hinge 402.

The body 404 includes a first body side 420 opposite a second body side 422, and a first body end 424 opposite a second body end 426. The body 404 may be composed of a metal, metal alloy or polymer, and may be formed via casting, stamping, injection molding, forging, additive manufacturing, etc. The first body side 420 includes a projection 428 and at least one seal 430. The projection 428 extends outwardly from the first body side 420 at or near the second body end 426. The projection 428 defines a pair of recesses 431, which each receive the at least one seal 430. In one example, the at least one seal 430 comprises a single seal, which is wrapped or positioned about the projection 428 and at least partially disposed in the recesses 431. The at least one seal 430 is sized and shaped to surround the opening 406 when the drain 124 is in the first, closed position to prevent the ingress and/or egress of fluids into the gas turbine engine 22. In one example, the projection 428 and the at least one seal 430 form a circular shape to be received within the opening 406, which is circular; however, the projection 428 and the at least one seal 430 may have any desired shape to correspond with a particular shape of the opening 406. The at least one seal 430 is coupled to the first body side 420 about the projection 428 so that the second, open position, the at least one seal 430 is removed from or spaced a distance apart from the opening 406 to enable fluids, such as liquids, to drain from the transcowl 118. In one example, the at least one seal 430 is an elastomeric seal, such as an O-ring; however, any suitable seal may be employed. Generally, in the first, closed position, the projection 428 and the at least one seal 430 are received within the opening 406, and in the second, open position, the projection 428 and the at least one seal 430 are spaced apart from the opening 406.

The second body side 422 includes a counterweight 432 and a scoop 434. Between the counterweight 432 and the scoop 434, the body 404 defines a throughbore 435. The throughbore 435 receives the hinge pin 310 to couple the body 404 to the hinge flange 408. Generally, the counterweight 432 is sized such that upon a decrease in fluid flow within the transcowl 118 (due to the gas turbine engine 22 not operating), the counterweight 432 moves the drain 124 from the first, closed position to the second, open position; and that upon an increase in fluid flow within the transcowl 118 (due to the gas turbine engine 22 operating), the scoop 434 moves the drain 124 from the second, open position to the first, closed position. The counterweight 432 is coupled to the second body side 422 so as to be at or near the first body end 424. In one example, the counterweight 432 is bulbous, and is coupled to the first body end 424 via a mechanical fastener, press-fit, adhesives, welding, etc. In this example, a pin 439 is press fit through a bore 436 defined in the first body end 424 and a corresponding bore 437 defined in the counterweight 432 to couple the counterweight 432 to the first body end 424. The counterweight 432 is generally composed of a metal or metal alloy, and may be cast, forged, selective laser sintered, etc. While described herein as being discrete from the first body end 424, it will be understood that the counterweight 432 may be integrally formed with the body 404, via additive manufacturing, casting, machining, etc.

The counterweight 432 may also be encased or at least partially include a layer of stop material 438. The layer of stop material 438 may substantially surround the counterweight 432, or may surround only a portion of the counterweight 432. In this example, the layer of stop material 438 surrounds a portion of a perimeter of the counterweight 432 to provide an energy absorbing layer in the instance that the counterweight 432 contacts the inner surface 126 of the transcowl 118 when the drain 124 is in the second, open position. The layer of stop material 438 may be composed of a polymer, for example, an elastomer, and may be coupled to the perimeter of the counterweight 432 via overmolding, adhesives, mechanical fasteners, etc. In this example, the layer of stop material 438 is coupled to the counterweight 432 via the pin 439.

The scoop 434 is coupled to the body 404 near or at the second body end 426. The scoop 434 has a first scoop end 440 opposite a second scoop end 442. The first scoop end 440 is coupled to the second body side 422 near or at the second body end 426, and the second scoop end 442 extends substantially radially outward from the second body end 426 to impinge on the fluid flow generated by the gas turbine engine 22, such as the engine exhaust flow 106, flowing through the transcowl 118. Thus, the scoop 434 has a generally arcuate shape. Aerodynamic forces generated by the contact between the engine exhaust flow 106 and the scoop 434 maintain the drain 124 in the first, closed position during the operation of the gas turbine engine 22. The scoop 434 is generally composed of a metal, metal alloy or polymer, and may be cast, forged, selective laser sintered, etc. The first scoop end 440 of the scoop 434 is coupled to the second body side 424 by welding, mechanical fasteners, adhesives, etc.

Figure 11:
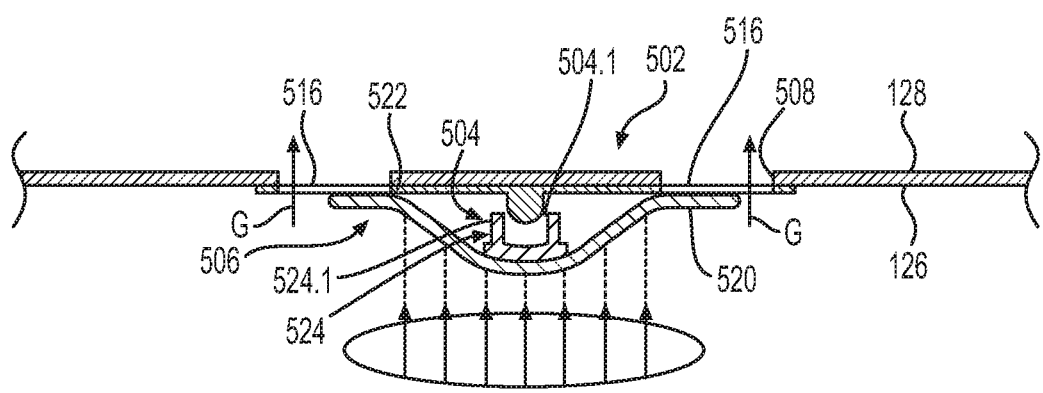
FIG. 11 is a side view of the assembly of FIG. 10, with the assembly in the second, open position.

In one example, in order to couple the drain 124 to the transcowl 118, the at least one seal 430 is coupled to the first body side 422 to surround the projection 428. With the counterweight 432 formed, the layer of stop material 438 is coupled about at least a portion of the perimeter of the counterweight 432. With the body 404 formed, the counterweight 432 is coupled to the body 404 via the pin 439. With the scoop 434 formed, the scoop 434 is coupled to the body 404. With the opening 406 defined in the transcowl 118 and the hinge flange 408 formed, the body 404 is coupled to the hinge flange 408 via the hinge pin 310. The hinge flange 408 is fixedly coupled to the inner surface 126 adjacent to the opening 406 such that the at least one seal 430 is received within the opening 406. With the drain 124 coupled to the transcowl 118, during operation of the gas turbine engine 22, the engine exhaust flow 106 impinges on the scoop 434, and the aerodynamic force of the engine exhaust flow 106 is sufficient to maintain the drain 124 in the first, closed position. Generally, the drain 124 remains in the first, closed position for an internal operating pressure that is about equal to or greater than about 0.1 pounds per square inch gauge (psig). Once the gas turbine engine 22 ceases to operate, the engine exhaust flow 106 within the transcowl 118 ceases. Without the engine exhaust flow 106 impinging on the scoop 434, the force of gravity acting on the counterweight 432 of the body 404 causes the body 404 to rotate about the hinge 402 to move the drain 124 into the second, open position, as shown in FIG. 11. In the second, open position, the at least one seal 430 is spaced apart and removed from the opening 406 to enable fluids, such as liquids, contained within the transcowl 118 to be released or drain into the ambient surroundings. Generally, in the second, open position, the fluids, such as liquids, within the gas turbine engine 22 and/or the transcowl 118 are released from the transcowl 118 into the ambient surroundings through the drain 124, thereby reducing a risk of corrosion from the fluids. It should be noted that the position of the opening 406 is not to scale, and that the opening 406 is positioned such that the opening 406 is as close as possible to a low point in the transcowl 118 to prevent pooling at a lower point in the transcowl 118.

Figure 10:
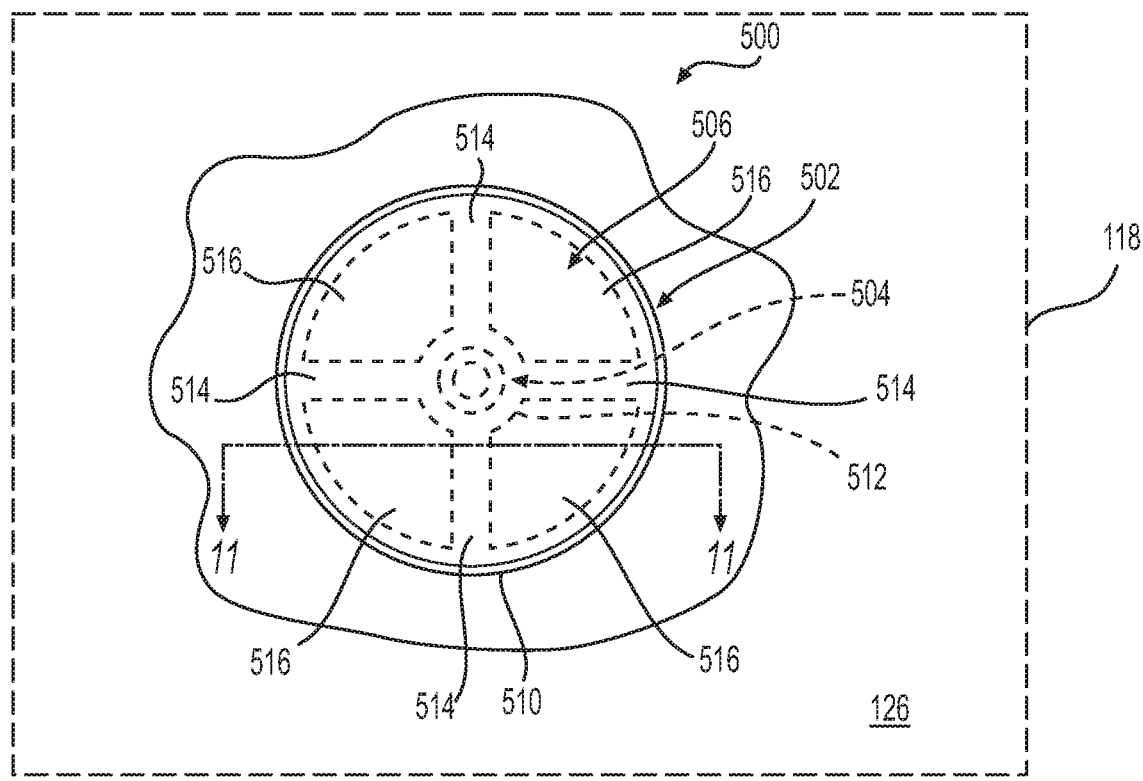
FIG. 10 is a top view of an exemplary vent and/or drain assembly for use with the thrust reverser system of FIG. 1, with the assembly in the first, closed position.

It will be understood that the vent 122 described with regard to FIGS. 1-7 and/or the drain 124 described with regard to FIGS. 8 and 9 may be configured differently to release hot gas and/or drain fluids from the gas turbine engine 22 and/or the transcowl 118 into the ambient surroundings. In one example, with reference to FIG. 10, a vent and/or drain assembly 500 is shown. In this regard, depending upon the placement of the assembly 500, the assembly 500 serves as a vent or the assembly 500 serves as a drain. As the assembly 500 includes components that are substantially similar to or the same as the vent 122 discussed with regard to FIGS. 1-7 and the drain 124 discussed with regard to FIGS. 8 and 9, the same reference numerals will be used to denote the same or similar features. It should be noted that while a single assembly 500 is shown, the transcowl 118 may include any number of assemblies 500 coupled to the upper surface 160 of the transcowl 118 (FIG. 4) to release hot gases from the gas turbine engine 22 and/or transcowl 118 into the ambient surroundings. Further, the transcowl 118 may include any number of assemblies 500 coupled to the lower surface 162 of the transcowl 118 (FIG. 4) to release fluids, such as liquids, into the ambient surroundings. Moreover, if a number of assemblies 500 are employed, the assemblies 500 may be arranged in any desired pattern to provide suitable venting of hot gases and/or the draining of fluids from the gas turbine engine 22 and/or transcowl 118. In addition, it should be noted that the size of the assembly 500 shown in FIG. 10 is merely exemplary, as the assembly 500 may have any desired size to enable venting of the hot gases and/or draining of fluids from the gas turbine engine 22 and/or the transcowl 118 based on a size of the gas turbine engine 22, for example. Further, while the assembly 500 is illustrated and described herein as circular, the assembly 500 may have any desired shape, such as rectangular, triangular, etc.

In one example, the assembly 500 includes a frame 502, a guide 504 and a diaphragm 506. In one example, the frame 502 is annular and is sized to be coupled about an opening 508 (FIG. 11) defined in the transcowl 118 from the inner surface 126 to the outer surface 128. In one example, a width of the opening 508 is greater than about 0.125 inches (in.), and in this example, the width of the opening 508 is about 1.0 inches (in.) to about 1.5 inches (in.) in diameter. The frame 502 may be composed of a metal or metal alloy, and may be formed by casting, forging, stamping, additive manufacturing, etc. In this example, the frame 502 has an outer circular support frame 510, an inner circular support frame 512 and at least one spoke 514 that interconnects the outer circular support frame 510 with the inner circular support frame 512. The outer circular support frame 510 has a diameter selected such that the outer circular support frame 510 is coupled about the opening 508. Generally, the outer circular support frame 510 is coupled to the inner surface 126 of the transcowl 118 about the opening 508 via welding, but any suitable technique may be employed such as mechanical fasteners, adhesives, etc. Moreover, the outer circular support frame 510 may be integrally formed with the inner surface 126 at the opening 508, if desired. The inner circular support frame 512 is coupled to or integrally formed with the outer circular support frame 510. As will be discussed, the inner circular support frame 512 is coupled to the guide 504.

The at least one spoke 514 is coupled to or integrally formed with the outer circular support frame 510 and the inner circular support frame 512. In this example, the frame 502 includes four spokes, which are spaced apart about the perimeter or circumference of the outer circular support frame 510. Each of the spokes 514 is sized to define a plurality of apertures 516. Each of the plurality of apertures 516 enables fluids to be released from the assembly 500 when the diaphragm 506 is in a second, open position (FIG. 11). In the first, closed position (FIG. 10), the apertures 516 are covered by the diaphragm 506 thereby preventing the egress and ingress of fluids into the transcowl 118.

The guide 504 is coupled to the inner circular support frame 512. In one example, with reference to FIG. 11, the guide 504 is a tube or post, which extends outward from the inner circular support frame 512. The guide 504 is composed of a metal or a metal alloy, and may be integrally formed with the frame 502. Alternatively, the guide 504 may be cast, stamped, forged, etc. and coupled to the inner circular support frame 512 via mechanical fasteners, welding, adhesives, etc. The guide 504 directs a motion of the diaphragm 506 relative to the frame 502. Generally, the guide 504 limits the motion of the diaphragm 506 to one direction. In one example, the guide 504 includes a lip 504.1 that cooperates with a portion of the diaphragm 506 to retain the diaphragm 506 on the guide 504. In one example, the guide 504 is about 0.25 inches (in.) to about 0.375 inches (in.) in diameter.

Figure 12:
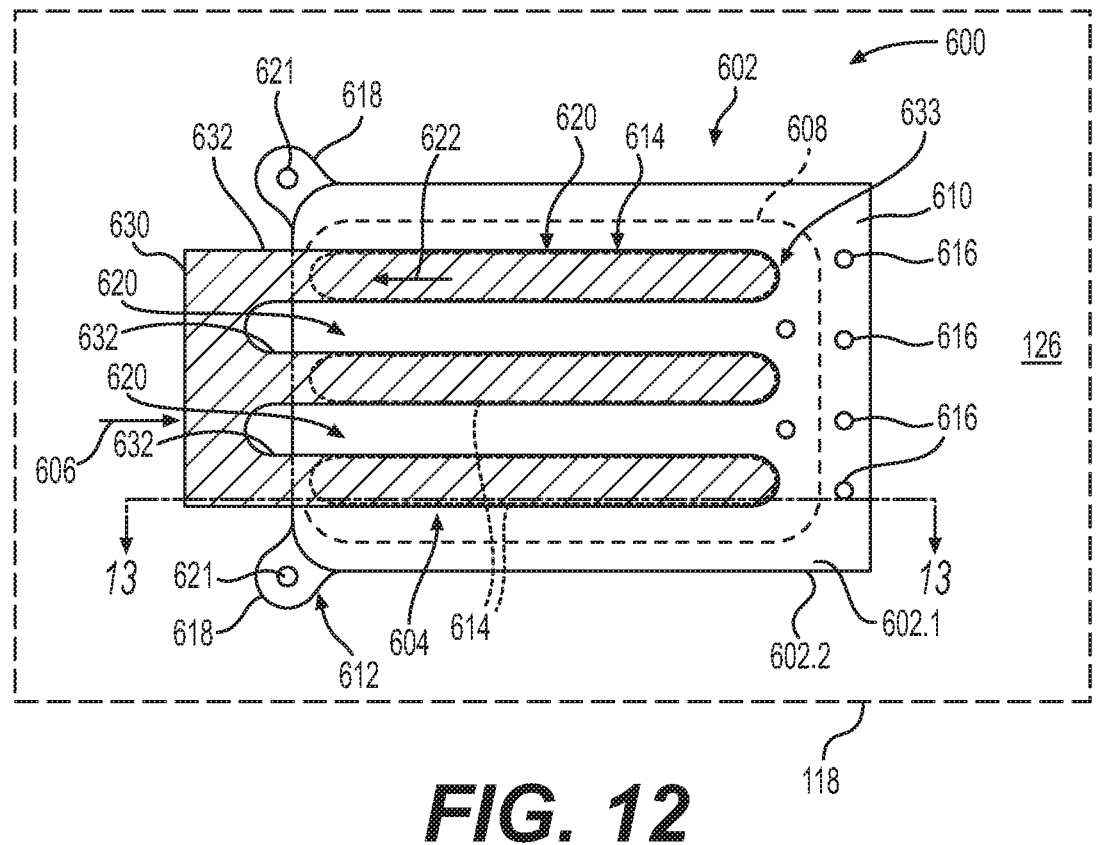
FIG. 12 is a top view of another exemplary vent and/or drain assembly for use with the thrust reverser system of FIG. 1, with the assembly in the first, closed position.

The diaphragm 506 is coupled to the guide 504 and is movable between a first, closed position in which the apertures 516 are closed to prohibit the ingress and/or egress of fluids into/from the transcowl 118 and a second, open position are open to enable the release of fluids from the transcowl 118. Thus, in this example, the diaphragm 506 is at least one sealing member, which is movable between the first, closed positon and the second, open position based on an operating condition of the gas turbine engine 22. The diaphragm 506 is composed of a polymer, such as an elastomeric material. Thus, the diaphragm 506 inherently has a spring force due to the nature of the material employed to form the diaphragm 506. As will be discussed, the internal operating pressure of the gas turbine engine 22 overcomes the inherent spring force of the diaphragm 506 to maintain the diaphragm 506 in the first, closed position. The diaphragm 506 may be formed by molding, casting, etc. The diaphragm 506 is sized such that the in the first, closed position the diaphragm 506 substantially covers the frame 502. The diaphragm 506 includes a first diaphragm surface 520 and an opposite, second diaphragm surface 522. The first diaphragm surface 520 faces the interior of the transcowl 118. The second diaphragm surface 522 faces the apertures 516 and includes a retainer 524. The second diaphragm surface 522 covers the apertures 516 when the assembly 500 is in the first, closed position (FIG. 12).

The retainer 524 slidably couples the diaphragm 506 to the guide 504. In one example, the retainer 524 is cup-shaped, and has a lip 524.1 that extends radially inward. The lip 524.1 cooperates with the lip 504.1 of the guide 504 to couple the retainer 524 to the guide 504. Generally, the lip 524.1 extends radially inward for a predefined distance so that contact between the lip 504.1 and the lip 524.1 prevents the diaphragm 506 from being uncoupled from the guide 504. The lip 524.1 also cooperates with the guide 504 to constrict the motion of the diaphragm 506 relative to the frame 502 into substantially one direction. The retainer 524 may be composed of a metal, metal alloy or polymer, and may be cast, forged, injection molded, stamped, etc. The retainer 524 may be coupled to the diaphragm 506 via any suitable technique, such as welding, adhesives, mechanical fasteners, etc.

In one example, in order to couple the assembly 500 to the transcowl 118, with the opening 508 defined in the upper surface 160 and/or lower surface 162 of the transcowl 118 (FIG. 4), with the frame 502 formed, the guide 504 is coupled to the frame 502. With the retainer 524 formed and coupled to the formed diaphragm 506, the diaphragm 506 is coupled to the guide 504, via pressing the retainer 524 over the lip 504.1 of the guide 504, for example. With the diaphragm 506 coupled to the guide 504, and thus, the frame 502, the frame 502 is fixedly coupled about the opening 508 such that the first diaphragm surface 520 is positioned within the transcowl 118.

In the example of the assembly 500 as a vent, with the assembly 500 coupled to the upper surface 160 the transcowl 118 (FIG. 4), during operation of the gas turbine engine 22, the internal operating pressure of the gas turbine engine 22 received within the transcowl 118 is sufficient to maintain the diaphragm 506 in the first, closed position. Generally, the diaphragm 506 remains in the first, closed position for an internal operating pressure that is about equal to or greater than about 14.8 pounds per square inch (psi). Once the gas turbine engine 22 ceases to operate, the internal pressure within the transcowl 118 decreases and trends towards ambient or atmospheric pressure. As the pressure within the transcowl 118 decreases, the force of gravity acting on the diaphragm 506 in combination with the spring force of the diaphragm 506 causes the diaphragm 506 move along the guide 504 until the lip 524.1 of the retainer 524 contacts the lip 504.1 of the guide 504. As the diaphragm 506 moves along the guide 504, the apertures 516 are uncovered or opened to move the assembly 500 into the second, open position, as shown in FIG. 11. In the second, open position, at least a portion of the diaphragm 506 is spaced apart from the frame 502 to enable the hot gases from the gas turbine engine 22 to be released or vented into the ambient surroundings through the apertures 516. Generally, in the second, open position, the hot gases within the gas turbine engine 22 and/or the transcowl 118 are released from the gas turbine engine 22 into the ambient surroundings through the assembly 500, thereby reducing temperatures experienced by the components associated with the gas turbine engine 22 upon shutdown.

In the example of the assembly 500 as a drain, with the assembly 500 coupled to the lower surface 162 of the transcowl 118 (FIG. 4), during operation of the gas turbine engine 22, the internal operating pressure of the gas turbine engine 22 received within the transcowl 118 is sufficient to maintain the diaphragm 506 in the first, closed position. Once the gas turbine engine 22 ceases to operate, the internal pressure within the transcowl 118 decreases and trends towards ambient or atmospheric pressure. As the pressure within the transcowl 118 decreases, the spring force of the diaphragm 506 causes the diaphragm 506 move along the guide 504 until the lip 524.1 of the retainer 524 contacts the lip 504.1 of the guide 504. As the diaphragm 506 moves along the guide 504, the apertures 516 are uncovered or opened to move the assembly 500 into the second, open position, as shown in FIG. 11. In the second, open position, the diaphragm 506 is spaced apart from the frame 502 to enable fluids, such as liquids, contained within the transcowl 118 to be released or drain into the ambient surroundings. Generally, in the second, open position, the fluids, such as liquids, within the gas turbine engine 22 and/or the transcowl 118 are released from the transcowl 118 into the ambient surroundings through the assembly 500, thereby reducing a risk of corrosion from the fluids.

It will be understood that the vent 122 described with regard to FIGS. 1-7 and/or the drain 124 described with regard to FIGS. 8 and 9 may be configured differently to release hot gas and/or drain fluids from the gas turbine engine 22 and/or the transcowl 118 into the ambient surroundings. In one example, with reference to FIG. 12, a vent and/or drain assembly 600 is shown. In this regard, depending upon the placement of the assembly 600, the assembly 600 serves as a vent or the assembly 600 serves as a drain.

As the assembly 600 includes components that are substantially similar to or the same as the vent 122 discussed with regard to FIGS. 1-7 and the drain 124 discussed with regard to FIGS. 8 and 9, the same reference numerals will be used to denote the same or similar features. It should be noted that while a single assembly 600 is shown, the transcowl 118 may include any number of assemblies 600 coupled to the upper surface 160 of the transcowl 118 (FIG. 4) to release hot gases from the gas turbine engine 22 and/or transcowl 118 into the ambient surroundings. Further, the transcowl 118 may include any number of assemblies 600 coupled to the lower surface 162 of the transcowl 118 (FIG. 4) to release fluids, such as liquids, into the ambient surroundings. Moreover, if a number of assemblies 600 are employed, the assemblies 600 may be arranged in any desired pattern to provide suitable venting of hot gases and/or the draining of fluids from the gas turbine engine 22 and/or transcowl 118. In addition, it should be noted that the size of the assembly 600 shown in FIG. 12 is merely exemplary, as the assembly 600 may have any desired size to enable venting of the hot gases and/or draining of fluids from the gas turbine engine 22 and/or the transcowl 118 based on a size of the gas turbine engine 22, for example. Further, while the assembly 600 is illustrated and described herein as rectangular, the assembly 600 may have any desired shape, such as circular, triangular, etc.

Figure 13:
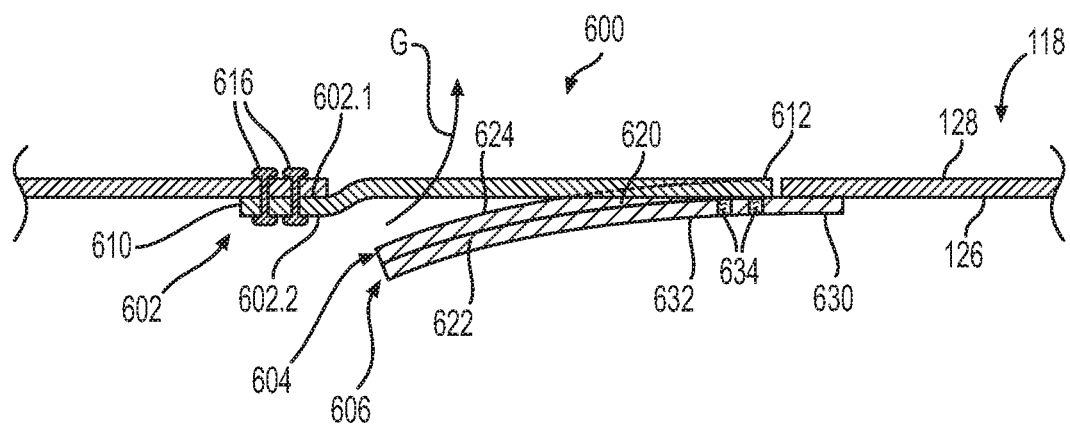
FIG. 13 is a side view of the assembly of FIG. 12, with the assembly in the second, open position.

In one example, the assembly 600 includes a frame 602, a plug layer 604 and a compliant layer 606. In one example, the frame 602 is rectangular and is sized to be coupled about an opening 608 defined in the transcowl 118 from the inner surface 126 to the outer surface 128 (FIG. 13). The frame 602 may be composed of a metal, metal alloy or composite material, and may be formed by casting, forging, stamping, additive manufacturing, hand lay-up, autoclave curing, etc. The frame 602 has a shape selected such that the frame 602 is coupled about the opening 608. The frame 602 has a first frame end 610 opposite a second frame end 612, and defines at least one slot or aperture 614 that extends between the first frame end 610 and the second frame end 612. The frame 602 also has a first frame surface 602.1 opposite a second frame surface 602.2. In one example, the first frame end 610 is coupled to the inner surface 126 of the transcowl 118 about the opening 608 (FIG. 15) via one or more mechanical fasteners 616, such as bolts, screws, rivets, etc., but any suitable technique may be employed such as welding, adhesives, etc. The first frame end 610 is generally coupled to the inner surface 126 along the first frame surface 602.1 such that the compliant layer 606 faces an interior of the transcowl 118. In addition, it should be noted that the frame 602 may be integrally formed with the inner surface 126 at the opening 608, if desired. The second frame end 612 includes a pair of fastening tabs 618, which receive one or more mechanical fasteners 621, such as bolts, rivets, screws, etc. to couple the second frame end 612 to the inner surface 126. In this example, the frame 602 defines a plurality of slots or apertures 614, which are spaced apart from each other in a radial direction and extend in a longitudinal direction between the first frame end 610 and the second frame end 612. Each of the apertures 614 enables fluids to be released through the transcowl 118. In one example, a width of the apertures 614 is greater than about 0.125 inches (in.), and in this example, a length of the apertures 614 is about 2.0 inches (in.) to about 4.0 inches (in.).

The plug layer 604 is coupled to the compliant layer 606 and is movable between a first, closed position in which the apertures 614 are closed to prohibit the ingress and/or egress of fluids into/from the transcowl 118 and a second, open position in which the apertures 614 are open to enable the release of fluids from the transcowl 118. Thus, the plug layer 604 is at least one sealing member that is movable (by the compliant layer 606) between the first, closed position and the second, open position based on an operating condition of the gas turbine engine 22. The plug layer 604 is composed of a polymer, such as an elastomeric material. The plug layer 604 may be formed by molding, casting, etc. The plug layer 604 is sized such that the in the first, closed position, the plug layer 604 substantially covers each of the apertures 614 defined in the frame 602. In one example, the plug layer 604 comprises at least one or a plurality of fingers 620. Generally, one of the fingers 620 corresponds to one of the apertures 614, and the fingers 620 are each sized to be received within the aperture 614 in the first, closed position to seal the respective aperture 614. In one example, each of the fingers 620 are discrete and are each coupled to the compliant layer 606. In other examples, the fingers 620 may be interconnected and coupled to the compliant layer 606. Each of the fingers 620 includes a first finger surface 622 and an opposite second finger surface 624. The first finger surface 622 is coupled to the compliant layer 606, and the second finger surface 624 is received within the respective aperture 614 to seal the respective aperture 614 in the first, closed position.

The compliant layer 606 is responsive to the operating pressure of the gas turbine engine 22 to move the assembly 600 between the first, closed position and the second, open position. In one example, the compliant layer 606 is composed of a metal or metal alloy, and is formed via stamping, casting, forging, etc. In one example, the compliant layer 606 may comprise a leaf spring, which has a spring force. The compliant layer 606 is coupled to the plug layer 604 and to the frame 602. The compliant layer 606 includes first layer end 630 and a plurality of compliant fingers 632 that extend from the first layer end 630 to define a second layer end 633. The first layer end 630 is uncoupled from the inner surface 126 of the transcowl 118, and overlaps the inner surface 126 of the transcowl 118 such that the first layer end 630 extends beyond the opening 608. Each of the compliant fingers 632 is coupled to a respective one of the fingers 620 of the plug layer 604 and is coupled to the frame 602 near the second frame end 612. In one example, the compliant fingers 632 are coupled to the fingers 620 and the frame 602 via one or more spot welds 634; however, any suitable technique may be employed, such as mechanical fasteners, adhesives, etc. By coupling the compliant fingers 632 to the fingers 620 and the frame 602 near the first layer end 630, the compliant fingers 632 act as a cantilevered beam, which enables the compliant layer 606 to bend to move the fingers 620 of the plug layer 604 from each of the apertures 614.

In one example, in order to couple the assembly 600 to the transcowl 118, with the opening 608 defined in the upper surface 160 and/or lower surface 162 of the transcowl 118 (FIG. 4), with the fingers 620 of the plug layer 604 and the compliant layer 606 formed, each of the fingers 620 is coupled to a respective one of the compliant fingers 632. With the frame 602 formed, the compliant layer 606 is coupled to the frame 602 near the second frame end 612. With the compliant layer 606 and the plug layer 604 coupled to the frame 602, the frame 602 is fixedly coupled to the inner surface 126 about the opening 608 such that the compliant layer 606 is positioned within the transcowl 118.

Figure 15:
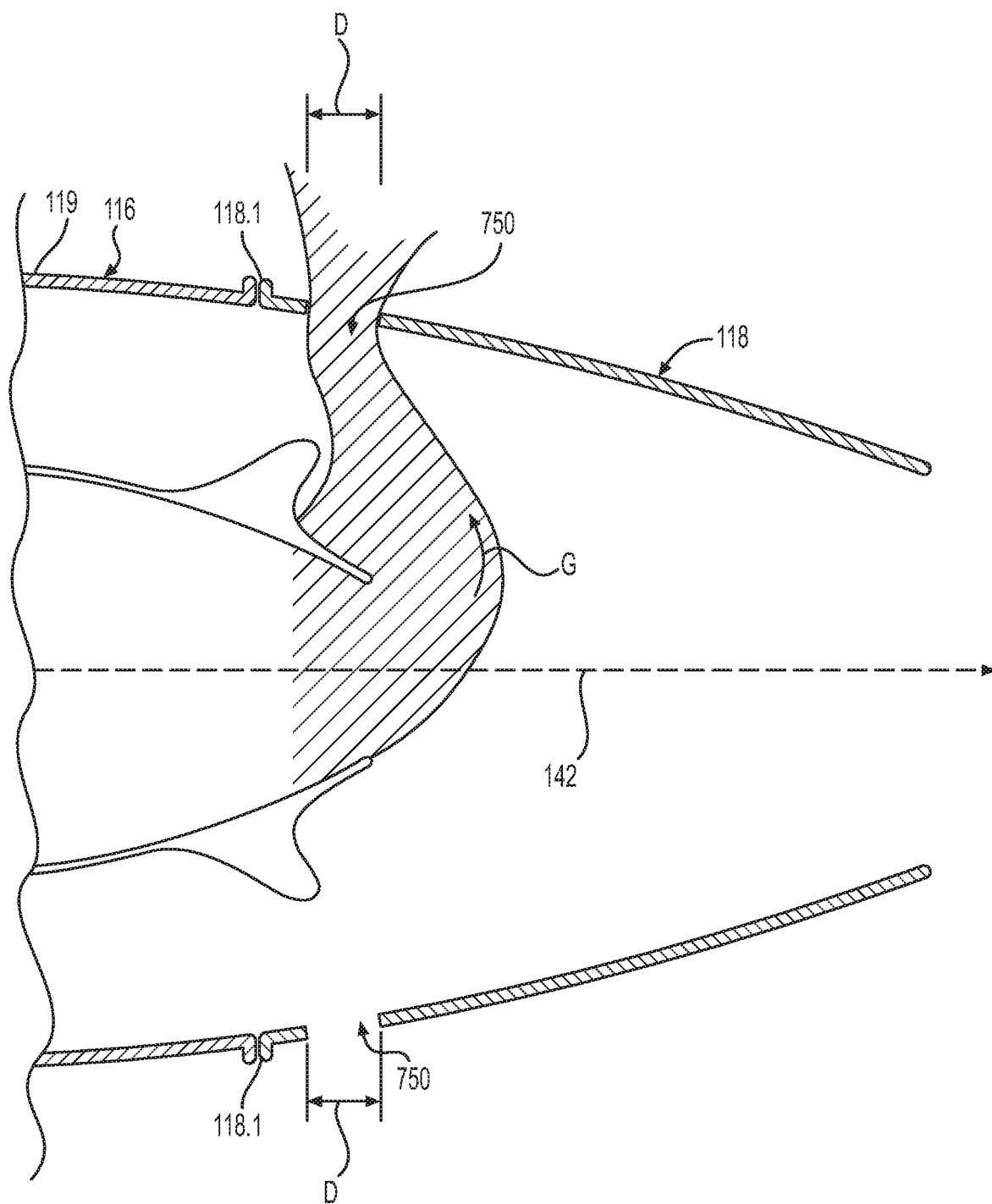
FIG. 15 is a schematic cross-sectional view of the thrust reverser assembly of the thrust reverser system of FIG. 1, with the transcowl of the thrust reverser assembly in a third, partially deployed position.

In the example of the assembly 600 as a vent, with the assembly 600 coupled to the upper surface 160 the transcowl 118 (FIG. 4), during operation of the gas turbine engine 22, the internal operating pressure of the gas turbine engine 22 received within the transcowl 118 is sufficient to maintain the compliant layer 606, and thus, the assembly 600 in the first, closed position. Generally, the compliant layer 606 remains in the first, closed position for an internal operating pressure that is about equal to or greater than about 14.8 pounds per square inch (psi). Once the gas turbine engine 22 ceases to operate, the internal pressure within the transcowl 118 decreases and trends towards ambient or atmospheric pressure. As the pressure within the transcowl 118 decreases, the spring force of the compliant layer 606 causes the compliant layer 606 bend, thereby moving the fingers 620 of the plug layer 604 out of the apertures 614. As the compliant layer 606 bends, the assembly 600 moves to the second, open position as shown in FIG. 15. In the second, open position, at least a portion of the plug layer 604 is spaced apart from the apertures 614 of the frame 602 to enable the hot gases from the gas turbine engine 22 to be released or vented into the ambient surroundings through the apertures 614. Generally, in the second, open position, the hot gases within the gas turbine engine 22 and/or the transcowl 118 are released from the gas turbine engine 22 into the ambient surroundings through the assembly 600, thereby reducing temperatures experienced by the components associated with the gas turbine engine 22 upon shutdown.

In the example of the assembly 600 as a drain, with the assembly 600 coupled to the lower surface 162 of the transcowl 118 (FIG. 4), during operation of the gas turbine engine 22, the internal operating pressure of the gas turbine engine 22 received within the transcowl 118 is sufficient to maintain the compliant layer 606 in the first, closed position. Once the gas turbine engine 22 ceases to operate, the internal pressure within the transcowl 118 decreases and trends towards ambient or atmospheric pressure. As the pressure within the transcowl 118 decreases, the spring force of the compliant layer 606 overcomes the force of gravity acting on the compliant layer 606 and causes the compliant layer 606 to bend upward. As the compliant layer 606 bends toward the second, open position, the fingers 620 of the plug layer 604 are removed from the apertures 614, which uncovers or opens the apertures 614. In the second, open position, the compliant layer 606 is spaced apart from the frame 602 to enable fluids, such as liquids, contained within the transcowl 118 to be released or drain into the ambient surroundings. Generally, in the second, open position, the fluids, such as liquids, within the gas turbine engine 22 and/or the transcowl 118 are released from the transcowl 118 into the ambient surroundings through the assembly 600, thereby reducing a risk of corrosion from the fluids.

With reference back to FIG. 1, the thrust reverser system 10 includes the human-machine interface 16. The human-machine interface 16 is in communication with the controller 20 via a suitable communication medium, such as a bus. The human-machine interface 16 may be configured in a variety of ways. In some embodiments, the human-machine interface 16 may include various input devices 30, such as switches or levers, one or more buttons, a touchscreen interface that may be overlaid on a display 32, a keyboard, an audible device, a microphone associated with a speech recognition system, or various other human-machine interface devices. In one example, the input device 30 may receive input, such as a command to stow the thrust reverser assembly 14, a command to deploy the thrust reverser assembly 14, a command to start-up the gas turbine engine 22, a command to shutdown the gas turbine engine 22, etc. Generally, upon the receipt of the input from the user, the input device 30 transmits a signal to the controller 20. As will be discussed, the controller 20 processes the signal, and determines the command requested by the user.

The display 32 comprises any suitable technology for displaying information, including, but not limited to, a liquid crystal display (LCD), organic light emitting diode (OLED), plasma, or a cathode ray tube (CRT). In this example, the display 32 is an electronic display capable of graphically displaying one or more user interfaces under the control of the controller 20. Those skilled in the art may realize other techniques to implement the display 32 in the aircraft 12.

The one or more sensors 18 observe various conditions of the aircraft 12 and/or thrust reverser assembly 14 and generate sensor signals based thereon. In one example, the one or more sensors 18 include a weight on wheels (WOW) sensor 34, a speed sensor 36, a temperature sensor 38, at least one resistance sensor 40 and at least one position sensor 42. Each of the sensors 18 are in communication with the controller 20 over a suitable communication architecture, such as a bus. The weight on wheels sensor 34 observes a weight placed on a landing gear associated with the aircraft 12. The weight on wheels sensor 34 generates sensor signals based on this observation, which are communicated to the controller 20. The weight on wheels sensor 34 may comprise a load cell or displacement sensor coupled to the landing gear, which is in communication with the controller 20.

The speed sensor 36 observes a speed of the aircraft 12, and generates sensor signals based on the observation. In one example, the speed sensor 36 is an airspeed sensor, which observes an airspeed associated with the aircraft 12 and generates sensor signals based thereon. The temperature sensor 38 observes a temperature within the thrust reverser assembly 14, and generates sensor signals based thereon. In one example, the temperature sensor 38 is coupled within the transcowl 118 (FIG. 4) of the thrust reverser assembly 14 to observe the temperature within the transcowl 118. For example, the temperature sensor 38 is coupled to the support structure 116, so as to observe a temperature within the thrust reverser assembly 14. In certain instances, the temperature sensor 38 may also be positioned to observe a temperature within a bypass duct coupled to the thrust reverser assembly 14 instead of or in addition to the temperature within the thrust reverser assembly 14. The temperature sensor 38 may be any suitable temperature sensor, such as a thermocouple, which is in communication with the controller 20.

In one example, the at least one resistance sensor 40 comprises two resistance sensors 40. In this example, each of the resistance sensors 40 is a proximity sensor, including, but not limited to, a capacitive proximity sensor, a photo-electric proximity sensor, etc. With reference to FIG. 4, one of the sensors 40a is coupled to the wall 118.7 so as to detect a distance that the upper surface 160 of the transcowl 118 is spaced apart from the wall 118.7, and another one of the sensors 40b is coupled to the wall 118.7 so as to detect a distance that the lower surface 162 of the transcowl 118 is spaced apart from the wall 118.7. It should be noted, however, that the resistance sensors 40a, 40b, may be coupled to at any desired location on the static support structure 116 to observe a displacement of the transcowl 118. The sensors 40a, 40b observe the displacement or distance between the transcowl 118 and the wall 118.7, and generate sensor signals thereon. The controller 20 receives and processes the sensor signals and based on a time and a displacement or distance traveled, the controller 20 determines an observed rate of motion or speed of the transcowl 118. As a rate of motion of the transcowl 118 by the actuators 140 is known and stored in a computer readable storage device or media 46 associated with the controller 20, the controller 20 determines whether the transcowl 118 has encountered resistance based on a change in the observed rate of motion of the transcowl 118 (based on the sensor signals from the resistance sensors 40) and the known rate of motion of the transcowl 118 (stored in the media 46). In one example, the controller 20 determines that the transcowl 118 has encountered resistance based on a decrease in the observed rate of motion of the transcowl 118 as compared to the known rate of motion.

Alternatively, the resistance sensor 40 may comprise two resistance sensors 40, one for each of the actuators 140. In this example, each of the resistance sensors 40 may observe a current of the motor 148 of the respective actuator 140. In one example, each of the resistance sensors 40 is coupled to a respective one of the motors 148 to observe the current of the motor 148 to determine whether a spike or increase in current has occurred. Generally, a spike or increase in current indicates that the leading edge 118.1 of the transcowl 118 has contacted an object before being fully stowed. The resistance sensors 40 may each be a Hall effect current sensor or other suitable sensor that is capable of observing a change in a current of the respective motor 148. Alternatively, the resistance sensor 40 may be a force resistance sensor, which is coupled along the leading edge 118.1 of the transcowl 118 and in communication with the controller 20.

In one example, the at least one position sensor 42 comprises two position sensors 42, one for each of the actuators 140. Each of the position sensors 42 observe a position of the respective actuator 140 and generates sensor signals based thereon. In the example of the actuators 140 as electric linear actuators, the position sensor 42 may comprise a potentiometer, which observes a position of the shaft 144 (FIG. 4) and generates sensor signals based thereon that are communicated to the controller 20. The position of the actuators 140 as fully extended denotes that the transcowl 118 is in the second, deployed position, and the position of the actuators 140 as fully retracted denotes that the transcowl 118 is in the first, stowed position. The position of the transcowl 118 based on the position of the actuators 140 is a known, predefined value, which is stored in the media 46 associated with the controller 20. It should be noted that other techniques may be employed to determine a position of the transcowl 118. For example, a proximity sensor may be coupled to the support structure 116 (FIG. 4) that observes and generates sensor signals based on a distance between one or more components of the transcowl 118 and the lock of the transcowl 118. In this example, the controller 20 determines that the transcowl 118 is in the first, stowed position based on the distance between the one or more components and the lock. As a further alternative, the lock may include a latch sensor, and the controller 20 may determine that the transcowl 118 is in the first, stowed position based on an engagement of the latch.

The controller 20 includes at least one processor 44 and the computer readable storage device or media 46. The processor 44 can be any custom made or commercially available processor, a central processing unit (CPU), a graphics processing unit (GPU), an auxiliary processor among several processors associated with the controller 20, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 20 in controlling components associated with the thrust reverser system 10.

The instructions may include one or more separate programs, each of which comprises an ordered listing of executable instructions for implementing logical functions. The instructions, when executed by the processor 44, receive and process input signals, perform logic, calculations, methods and/or algorithms for controlling the components of the thrust reverser system 10 of the aircraft 12, and generate control signals to the actuators 140 of the thrust reverser system 10 to control or manage a temperature with the transcowl 118 and/or to drain fluids within the transcowl 118 based on the logic, calculations, methods, and/or algorithms. Although only one controller 20 is shown in FIG. 1, embodiments of the aircraft 12 may include any number of controllers 20 that communicate over any suitable communication medium or a combination of communication mediums and that cooperate to process the sensor signals, perform logic, calculations, methods, and/or algorithms, and generate control signals to control features of the aircraft 12.

In various embodiments, one or more instructions of the controller 20 are associated with the thrust reverser system 10 and, when executed by the processor 44, the instructions receive and process signals from the human-machine interface 16 and the sensors 18 to determine various conditions associated with the operation of the aircraft 12. For example, as will be discussed herein, the instructions of the controller 20, when executed by the processor 44, determine whether to output one or more control signals to the actuators 140 to move the transcowl 118 based on the determined conditions associated with the aircraft 12.

Figure 14:
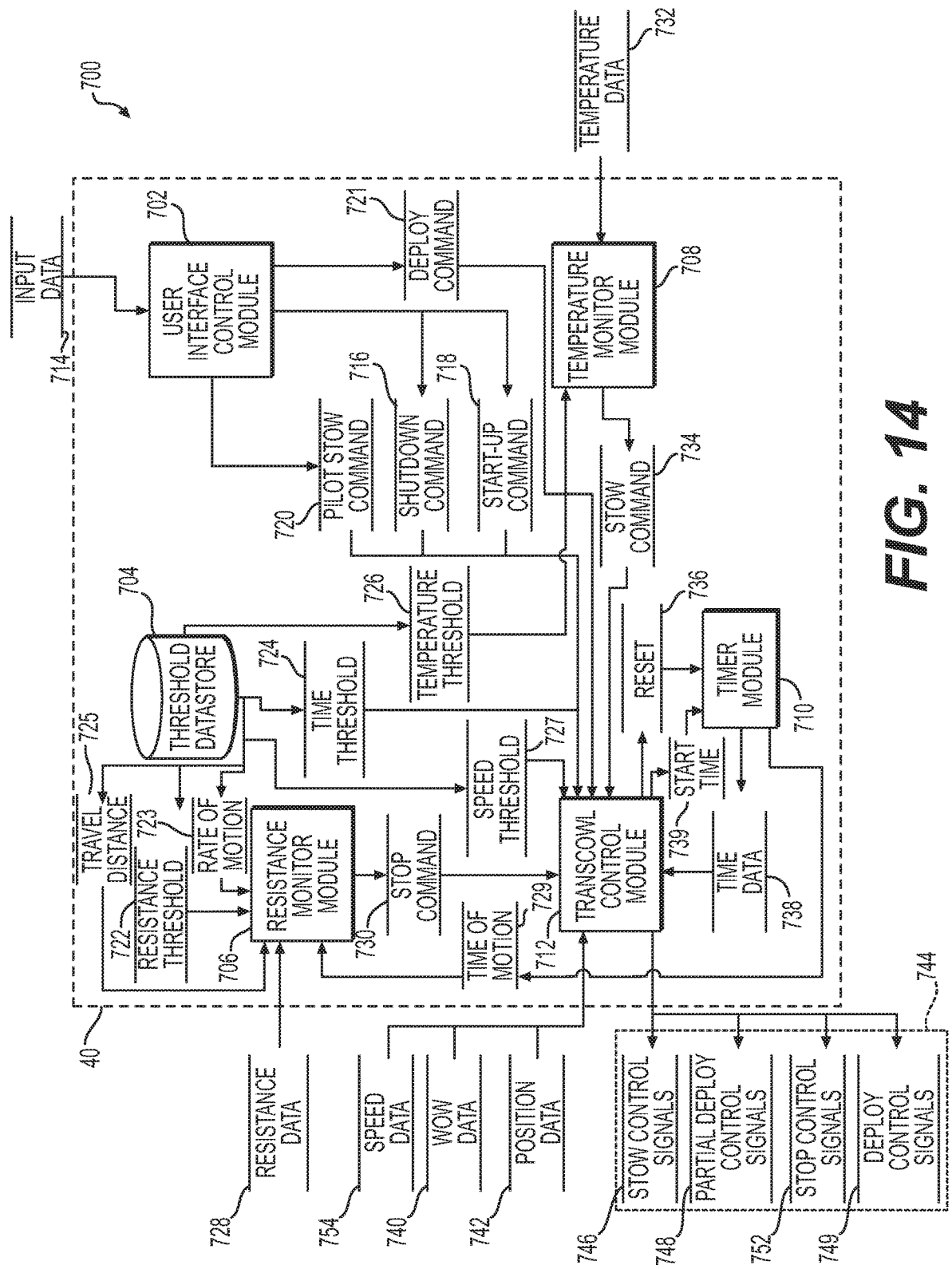
FIG. 14 is a dataflow diagram illustrating a control system for the thrust reverser system of FIG. 1, in accordance with various embodiments.

For example, as shown in more detail with regard to FIG. 14 and with continued reference to FIGS. 1-5, a dataflow diagram illustrates various embodiments of a control system 700 of the thrust reverser system 10 for the aircraft 12, which may be embedded within the controller 20. Various embodiments of the thrust reverser system 10 according to the present disclosure can include any number of sub-modules embedded within the controller 20. As can be appreciated, the sub-modules shown in FIG. 14 can be combined and/or further partitioned to similarly control the actuators 140. Inputs to the thrust reverser system 10 may be received from the human-machine interface 16 (FIG. 1), the sensors 18 (FIG. 1), received from other control modules (not shown) associated with the aircraft 12, and/or determined/modeled by other sub-modules (not shown) within the controller 20. In various embodiments, the thrust reverser system 10 includes a user interface (UI) control module 702, a threshold datastore 704, a resistance monitor module 706, a temperature monitor module 708, a timer module 710 and a transcowl control module 712.

The UI control module 702 receives input data 714. The input data 714 is received from an occupant's interaction with the human-machine interface 16. The UI control module 702 processes the input data 714 and determines whether the input data 714 comprises a command to shutdown the gas turbine engine 22. If true, the UI control module 702 sets shutdown command 716 for the transcowl control module 712. The shutdown command 716 comprises a command to shutdown the gas turbine engine 22, as received from the human-machine interface 16. The UI control module 702 also processes the input data 714 and determines whether the input data 714 comprises a command to start-up the gas turbine engine 22. If true, the UI control module 702 sets start-up command 718 for the transcowl control module 712. The start-up command 718 comprises a command to start-up the gas turbine engine 22, as received from the human-machine interface 16. The UI control module 702 processes the input data 714 and determines whether the input data 714 comprises a command to stow the transcowl 118. If true, the UI control module 702 sets pilot stow command 720 for the transcowl control module 712. The pilot stow command 720 is a command to move the transcowl 118 from the second, deployed position to the first, stowed position. The UI control module 702 processes the input data 714 and determines whether the input data 714 comprises a command to deploy the transcowl 118. If true, the UI control module 702 sets deploy command 721 for the transcowl control module 712. The deploy command 721 is a command to move the transcowl 118 to the second, deployed position from the first, stowed position.

The threshold datastore 704 stores data that provides one or more thresholds for conditions associated with the aircraft 12. In one example, the threshold datastore 704 stores a resistance threshold 722, a rate of motion 723, a time threshold 724, a travel distance 725, a temperature threshold 726 and a speed threshold 727. The resistance threshold 722 comprises a predefined maximum value of a decrease in a rate of motion observed by the resistance sensors 40. In one example, the resistance threshold 722 is about a 10% change in the rate of motion. For example, for a known rate of motion of about 0.25 inches (in.) per second, the resistance threshold 722 is a rate of motion of about 0.225 inches (in.) per second. The rate of motion 723 is a predefined rate of motion of the transcowl 118 to be moved by the actuators 140 from the second, deployed position to the first, stowed position. In one example, the rate of motion 723 is about 0.25 inches (in.) per second. The time threshold 724 comprises a predefined maximum amount of time for the transcowl 118 to remain in the second, deployed position for releasing hot gases from the gas turbine engine 22. In one example, the time threshold 724 is about 500 seconds (s.) to about 1000 seconds (s.). The travel distance 725 is predefined distance between the wall 118.7 and the leading edge 118.1 of the transcowl 118 when the transcowl 118 is in the second, deployed position. In on example, the travel distance 725 is about 7 inches (in.) to about 15 inches (in.). It should be noted that the travel distance 725 is merely an example, as the travel distance for a particular transcowl 118 may vary based on a size of the thrust reverser assembly 14. The temperature threshold 726 comprises a predefined maximum value of an acceptable temperature observed by the temperature sensor 38 within the transcowl 118. In one example, the temperature threshold 726 is about 250 degrees Fahrenheit to about 400 degrees Fahrenheit. The speed threshold 727 comprises a predefined maximum value of an acceptable airspeed for the aircraft 12 observed by the speed sensor 36. In one example, the speed threshold 727 is about 25 knots to about 35 knots.

The resistance monitor module 706 receives as input resistance data 728. The resistance data 728 comprises the sensor data or sensor signals from the resistance sensors 40 that indicate a distance between the transcowl 118 and the wall 118.7. The resistance monitor module 706 queries the threshold datastore 704 and retrieves the travel distance 725. The resistance monitor module 706 determines a displacement or distance traveled by the transcowl 118 by subtracting the observed displacement or distance between the transcowl 118 and the wall 118.7 from the travel distance 725. The resistance monitor module 706 receives as input time of motion 729 from the timer module 710. The time of motion 729 is an amount of time, in seconds for example, that has elapsed since one or more control signals were output to move the transcowl 118 to the first, stowed position. The resistance monitor module 706 divides the displacement or distance traveled by the transcowl 118 by the time of motion 729 to determine the observed rate of motion of the transcowl 118. The resistance monitor module 706 queries the threshold datastore 704 and retrieves the resistance threshold 722. The resistance monitor module 706 compares the determined observed rate of motion (based on the sensor signals from the resistance sensors 40) to the resistance threshold 722. If the determined observed rate of motion is less than the resistance threshold 722, the resistance monitor module 706 sets stop command 730 for the transcowl control module 712. The stop command 730 is a command to stop the actuators 140 to stop the motion of the transcowl 118.

The temperature monitor module 708 receives as input temperature data 732. The temperature data 732 comprises the sensor data or sensor signals from the temperature sensor 38. The temperature monitor module 708 processes the sensor signals and determines the temperature within the transcowl 118. The temperature monitor module 708 queries the threshold datastore 704 and retrieves the temperature threshold 726. The temperature monitor module 708 compares the determined observed temperature (based on the sensor signals from the temperature sensor 38) to the temperature threshold 726. If the determined observed temperature is less than the temperature threshold 726, the temperature monitor module 708 sets stow command 734 for the transcowl control module 712. The stow command 734 is a command to actuate the actuators 140 to move the transcowl 118 from the second, deployed position to the first, stowed position.

The timer module 710 monitors a period of time, in seconds, for example. The timer module 710 outputs timer data 738 for the transcowl control module 712. The timer data 738 is an amount of time that has elapsed in seconds, for example. The timer module 710 receives as input reset 736. The reset 736 is a command to reset the timer data 738 equal to zero seconds.

The timer module 710 also receives as input start time 739 from the transcowl control module 712. The start time 739 is a command to start a timer for a motion of the transcowl 118 from the second, deployed position to the first, stowed position by the actuators 140. Based on the start time 739, the timer module 710 sets the time of motion 729 for the resistance monitor module 706. Generally, the time of motion 729 resets to zero seconds upon the receipt of the start time 739 as input by the timer module 710.

The transcowl control module 712 receives as input WOW data 740. The WOW data 740 comprises the sensor data or sensor signals from the weight on wheels sensor 34. The transcowl control module 712 processes the WOW data 740 and determines whether the aircraft 12 is on the ground, such that weight is on the landing gear. If true, the transcowl control module 712 determines whether the deploy command 721 has been received. Based on the receipt of the deploy command 721, the transcowl control module 712 outputs one or more control signals 744. In one example, the one or more control signals 744 include stow control signals 746, partial deploy control signals 748, deploy control signals 749 and stop control signals 752. The stow control signals 746 comprise a command to the actuators 140 to move the transcowl 118 to the first, stowed position. The partial deploy control signals 748 comprise a command to the actuators 140 to move the transcowl 118 to a partially deployed position. The partially deployed position is a position of the transcowl 118 between the first, stowed position (FIGS. 2 and 4) and the second, deployed position (FIGS. 3 and 5). The deploy control signals 749 comprise a command to the actuators 140 to move the transcowl 118 to the second, deployed position (FIGS. 3 and 5). The stop control signals 752 comprise one or more control signals to stop the motion of the actuators 140. As will be discussed, the transcowl control module 712 outputs the stop control signals 752 when the aircraft 12 is on the ground to inhibit item(s) from being captured within the transcowl 118 as the transcowl 118 is moving to the first, stowed position. As will be discussed, generally, after the transcowl control module 712 outputs the stop control signals 752, the transcowl control module 712 outputs the partial deploy control signals 748 to move the transcowl 118 to the partially deployed position to allow the removal or release of the item(s).

In one example, the partially deployed position results in the leading edge 118.1 of the transcowl 118 being spaced apart from the front flange 119 by a distance D to define an opening 750. The distance D is less than a distance the transcowl 118 is spaced apart from the front flange 119 in the second, deployed position and in one example, the distance D ranges from about 0.1 inch (in.) to about 2.0 inches (in.). For example, with reference to FIG. 15, the transcowl 118 is shown in the partially deployed position. With the transcowl 118 in the partially deployed position, hot gases G vent through the opening 750 and liquids may be released through opening 750, reducing a temperature within the transcowl 118 and the gas turbine engine 22 and also reducing a pooling of liquids within the transcowl 118.

With reference back to FIG. 14, based on the receipt of the deploy command 721, the transcowl control module 712 outputs the deploy control signals 749 to move the transcowl 118 of the thrust reverser assembly 14 to the second, deployed position. In the second, deployed position, the thrust reverser assembly 14 generates reverse thrust, which assists in slowing the aircraft 12.

The transcowl control module 712 also receives as input the start-up command 718. Based on the receipt of the start-up command 718, the transcowl control module 712 outputs the stow control signals 746 to move the transcowl 118 to the first, stowed position and sets the start time 739 for the timer module 710. The transcowl control module 712 monitors for receipt of the stop command 730 from the resistance monitor module 706.

The transcowl control module 712 also receives as input the pilot stow command 720. In one example, the pilot stow command 720 is received once reverse thrust is no longer needed to slow the aircraft 12. In other examples, the pilot stow command 720 is received to override a delayed closing of the transcowl 118, due to an encountering of resistance, for example. Based on the receipt of the pilot stow command 720, the transcowl control module 712 outputs the stow control signals 746 and sets the start time 739 for the timer module 710. The transcowl control module 712 monitors for the receipt of the stop command 730 from the resistance monitor module 706. In certain embodiments, as will be discussed, in the example of the pilot stow command 720 received when the transcowl 118 is in the second, deployed position, the transcowl control module 712 outputs the partial deploy control signals 748. In this embodiment, by moving the transcowl 118 to the partially deployed position, idle thrust generated by the gas turbine engine 22 may be managed by partially exhausting this idle thrust through the partially open or partially deployed transcowl 118.

The transcowl control module 712 also receives as input speed data 754. The speed data 754 comprises the sensor data or sensor signals from the speed sensor 36. The transcowl control module 712 processes the speed data 754 and determines the airspeed of the aircraft 12. The transcowl control module 712 queries the threshold datastore 704 and retrieves the speed threshold 727. The transcowl control module 712 compares the determined observed airspeed (from the speed sensor 36) with the speed threshold 727. In certain embodiments, if the determined observed airspeed is less than the speed threshold 727, the transcowl control module 712 outputs the partial deploy control signals 748 to the actuators 140 to move the transcowl 118 to the partially deployed position. In other embodiments, the transcowl control module 712 determines whether the shutdown command 716 has been received. If true, in certain embodiments, the transcowl control module 712 outputs the partial deploy control signals 748 to the actuators 140 to move the transcowl 118 to the partially deployed position.

The transcowl control module 712 receives as input the shutdown command 716. Based on the receipt of the shutdown command 716, the transcowl control module 712 determines whether the stow command 734 has been received from the temperature monitor module 708. If true, the transcowl control module 712 outputs the stow control signals 746 and sets the start time 739 for the timer module 710. The transcowl control module 712 monitors for receipt of the stop command 730 from the resistance monitor module 706.

The transcowl control module 712 receives as input the stop command 730. Based on the receipt of the stop command 730, the transcowl control module 712 outputs the stop control signals 752 to the actuators 140 to stop the motion of the actuators 140, and thus, the transcowl 118. The transcowl control module 712 also substantially simultaneously sets the reset 736 for the timer module 710 to reset the timer data 738 equal to zero seconds (T=0). The transcowl control module 712 outputs the partial deploy control signals 748 to the actuators 140 to move the transcowl 118 to the partially deployed position. By stopping the motion of the transcowl 118 and re-opening the transcowl 118, any object within the transcowl 118 may be easily removed. The transcowl control module 712 determines whether the pilot stow command 720 has been received as input. If true, the transcowl control module 712 outputs the stow control signals 746 and sets the start time 739 for the timer module 710. The transcowl control module 712 monitors for receipt of the stop command 730 from the resistance monitor module 706.

Otherwise, the transcowl control module 712 queries the threshold datastore 704 and retrieves the time threshold 724. The transcowl control module 712 receives as input the timer data 738. The transcowl control module 712 compares the timer data 738 to the time threshold 724. If the timer data 738 is greater than the time threshold 724, the transcowl control module 712 outputs the stow control signals 746 and sets the start time 739 for the timer module 710. The transcowl control module 712 monitors for receipt of the stop command 730 from the resistance monitor module 706.

In certain embodiments, the transcowl control module 712 may also receive as input position data 742. The position data 742 comprises the sensor data or sensor signals from the position sensors 42. The transcowl control module 712 processes the position data 742 and determines whether the transcowl 118 is in the first, stowed position or the second, deployed position based on the position of the actuators 140. Note, that depending on the position sensor 42, the transcowl control module 712 may also determine whether the transcowl 118 is in a position between the first, stowed position and the second, deployed position based on the position of the actuators 140. Moreover, based on the position of the actuators 140 determined based on the sensor signals from the position sensor 42, the transcowl control module 712 may also query a table datastore, which may store one or more look up tables that correlate an observed position of the actuators 140 with a position of the transcowl 118. In one example, the transcowl control module 712 monitors for receipt of the stop command 730 from the resistance monitor module 706 based on the position of the transcowl 118. In certain embodiments, the transcowl control module 712 may output the one or more control signals 744 based on the position data 742. In other embodiments, a proximity sensor may be coupled to the support structure 116 (FIG. 4) that observes and generates sensor signals based on a distance between one or more components of the transcowl 118 and the lock of the transcowl 118. In this example, the transcowl control module 712 determines that the transcowl 118 is in the first, stowed position based on the distance between the one or more components and the lock. As a further alternative, the lock may include a latch sensor, and the transcowl control module 712 may determine that the transcowl 118 is in the first, stowed position based on an engagement of the latch.

Figure 16:
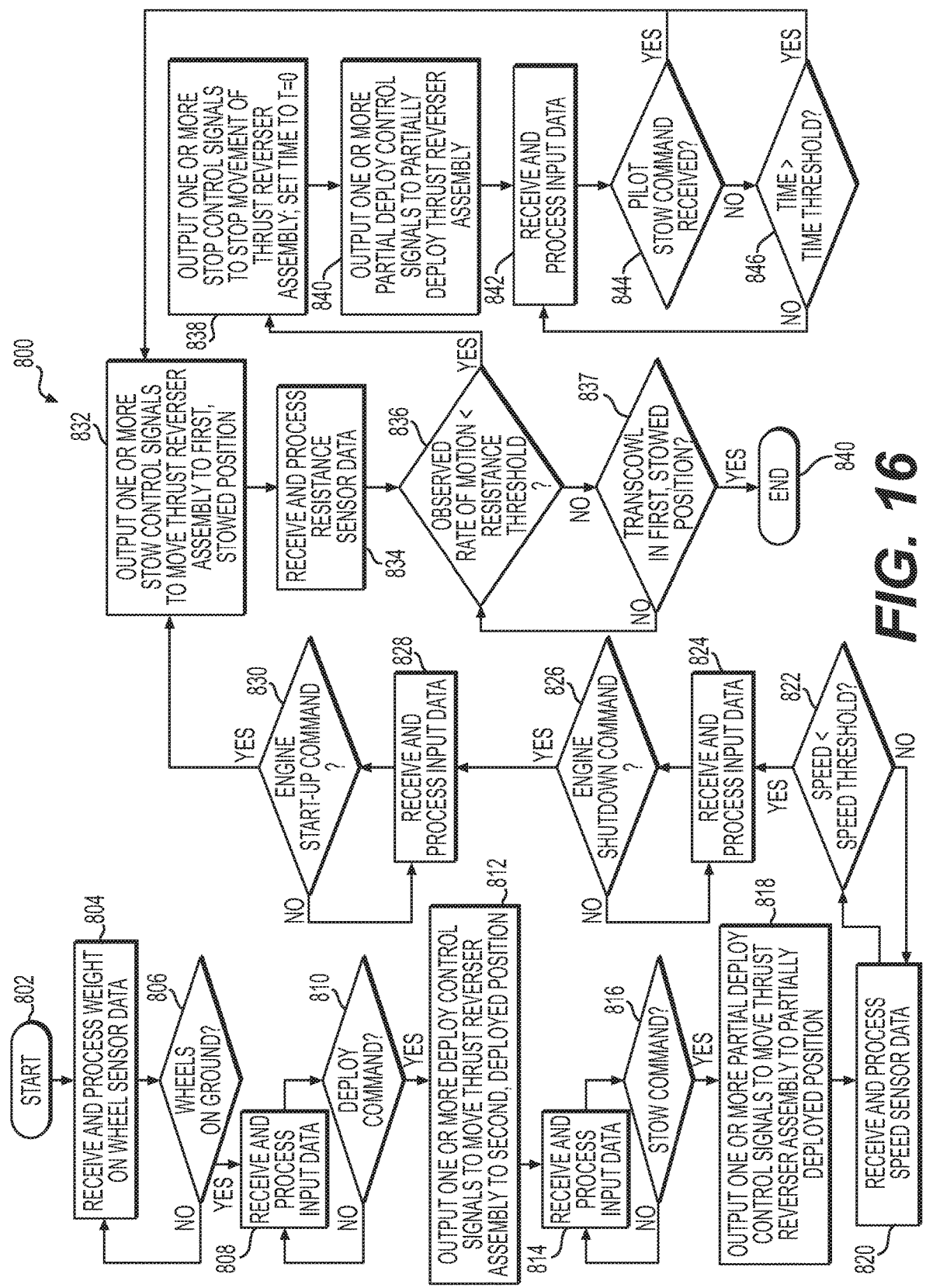
FIG. 16 is a flowchart illustrating an exemplary control method for the thrust reverser system of FIG. 1, in accordance with various embodiments.

Referring now to FIG. 16, and with continued reference to FIGS. 1-5 and 14, a flowchart illustrates a control method 800 that can be performed by the thrust reverser system 10 of FIGS. 1-5 and 14 in accordance with the present disclosure. In various embodiments, the control method 800 is performed by the processor 44 of the controller 20. As can be appreciated in light of the disclosure, the order of operation within the method is not limited to the sequential execution as illustrated in FIG. 16, but may be performed in one or more varying orders as applicable and in accordance with the present disclosure. In various embodiments, the method 800 can be scheduled to run based on one or more predetermined events, and/or can run continuously during operation of the aircraft 12.

In one example, the method begins at 802. At 804, the method receives and processes the WOW data 740 to determine whether the aircraft 12 is on the ground. At 806, the method determines, based on the WOW data 740, whether the wheels of the landing gear associated with the aircraft 12 are on the ground. If true, the method proceeds to 808. Otherwise, the method loops to 804.

At 808, the method receives and processes the input data 714 from the human-machine interface 16. At 810, the method determines, based on the input data 714, whether the deploy command 721 is received. If true, the method proceeds to 812. Otherwise, the method loops to 808.

At 812, the method outputs the deploy control signals 749 to the actuators 140 to move the transcowl 118, and thus, the thrust reverser assembly 14, to the second, deployed position (FIGS. 3 and 5) to generate reverse thrust. At 814, the method receives and processes the input data 714 from the human-machine interface 16. At 816, the method determines, based on the input data 714, whether the pilot stow command 720 is received. If true, the method proceeds to 818. Otherwise, the method loops to 814.

At 818, the method outputs the partial deploy control signals 748 to the actuators 140 to move the transcowl 118, and thus, the thrust reverser assembly 14, to the partially deployed position (FIG. 17) to provide idle thrust management. At 820, the method receives and processes the speed data 754 from the speed sensor 36 to determine an airspeed of the aircraft 12. At 822, the method retrieves the speed threshold 727 from the threshold datastore 704 and determines whether the airspeed of the aircraft 12 from the speed data 754 is less than the speed threshold 727. If true, the method proceeds to 824. Otherwise, the method loops to 820.

At 824, the method receives and processes the input data 714 from the human-machine interface 16. At 826, the method determines, based on the input data 714, whether the shutdown command 716 is received that commands the gas turbine engine 22 to shutdown. If true, the method proceeds to 828. Otherwise, the method loops to 824.

At 828, the method receives and processes the input data 714 from the human-machine interface 16. At 830, the method determines, based on the input data 714, whether a start-up command 718 has been received. If true, the method proceeds to 832. Otherwise, the method loops to 828.

At 832, the method outputs the stow control signals to the actuators 140 to move the transcowl 118, and thus, the thrust reverser assembly 14, to the first, stowed position (FIGS. 2 and 4), and sets the start time 739 command for the timer module 710. At 834, the method receives and processes the resistance data 728 from the resistance sensors 40. At 836, the method retrieves the resistance threshold 722 from the threshold datastore 704 and determines, based on the observed rate of motion of the transcowl 118, whether the observed rate of motion of the transcowl 118 determined from the resistance data 728 is less than the resistance threshold 722. In one example, the method retrieves the travel distance 725 from the threshold datastore and determines an observed displacement or distance traveled by the transcowl 118 relative to the wall 118.7 of the support structure 116. The method determines the observed rate of motion of the transcowl 118 based on dividing the observed distanced traveled by the time of motion 729. The method compares the observed rate of motion of the transcowl 118 to the resistance threshold 722. If the transcowl 118 is moving at a rate of motion that is less than the resistance threshold 722, the method proceeds to 838. Otherwise, if false, the method proceeds to 837. At 837, the method determines whether the transcowl 118 is in the first, stowed position. In one example, the method receives and processes the position data 742 from the position sensors 42 and determines whether the transcowl 118 of the thrust reverser assembly 14 is in the first, stowed position based on the position data 742. If true, the method ends at 840. If false, the method loops to 836.

At 838, the method outputs the stop control signals to the actuators 140 to stop the movement of the transcowl 118 and sets the reset 736 to the timer module 710 to set the timer data 738 (T) equal to zero. At 840, the method outputs the partial deploy control signals 748 to the actuators 140 to move the transcowl 118 to the partially deployed position. At 842, the method receives and processes the input data 714. At 844, the method determines, based on the input data 714, whether the pilot stow command 720 has been received. If true, the method proceeds to 832. Otherwise, at 846, the method retrieves the time threshold 724 from the threshold datastore 704 and determines whether the timer data 738 from the timer module 710 is greater than the time threshold 724. If true, the method proceeds to 832. Otherwise, the method loops to 842.

Figure 17:
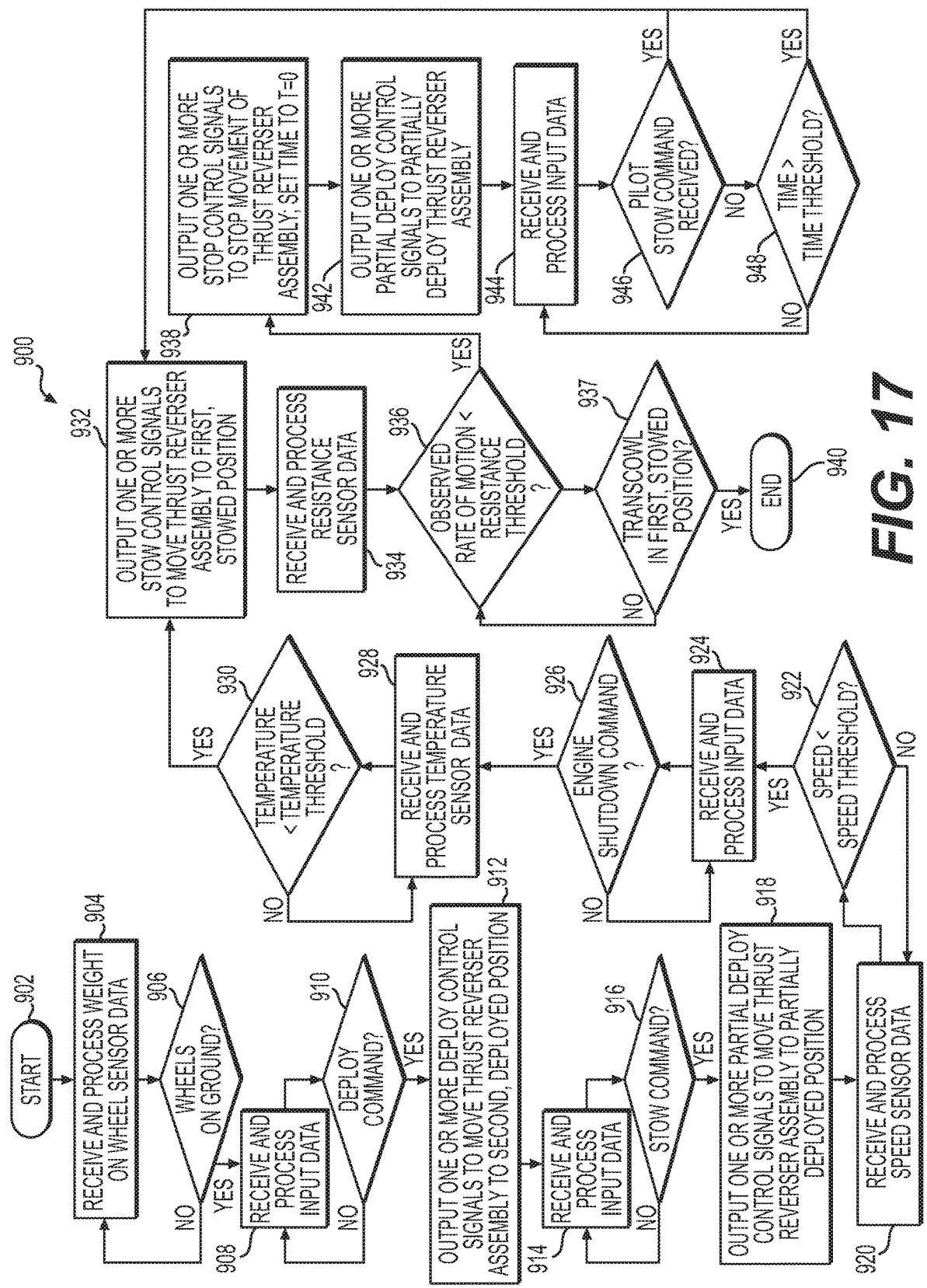
FIG. 17 is a flowchart illustrating another exemplary control method for the thrust reverser system of FIG. 1, in accordance with various embodiments.

Referring now to FIG. 17, and with continued reference to FIGS. 1-5 and 14, a flowchart illustrates a control method 900 that can be performed by the thrust reverser system 10 of FIGS. 1-5 and 14 in accordance with the present disclosure. In various embodiments, the control method 900 is performed by the processor 44 of the controller 20. As can be appreciated in light of the disclosure, the order of operation within the method is not limited to the sequential execution as illustrated in FIG. 17, but may be performed in one or more varying orders as applicable and in accordance with the present disclosure. In various embodiments, the method 900 can be scheduled to run based on one or more predetermined events, and/or can run continuously during operation of the aircraft 12.

In one example, the method begins at 902. At 904, the method receives and processes the WOW data 740 to determine whether the aircraft 12 is on the ground. At 906, the method determines, based on the WOW data 740, whether the wheels of the landing gear associated with the aircraft 12 are on the ground. If true, the method proceeds to 908. Otherwise, the method loops to 904.

At 908, the method receives and processes the input data 714 from the human-machine interface 16. At 910, the method determines, based on the input data 714, whether the deploy command 721 is received. If true, the method proceeds to 912. Otherwise, the method loops to 908.

At 912, the method outputs the deploy control signals 749 to the actuators 140 to move the transcowl 118, and thus, the thrust reverser assembly 14, to the second, deployed position (FIGS. 3 and 5) to generate reverse thrust. At 914, the method receives and processes the input data 714 from the human-machine interface 16. At 916, the method determines, based on the input data 714, whether the pilot stow command 720 is received. If true, the method proceeds to 918. Otherwise, the method loops to 914.

At 918, the method outputs the partial deploy control signals 748 to the actuators 140 to move the transcowl 118, and thus, the thrust reverser assembly 14, to the partially deployed position (FIG. 17) to provide idle thrust management. At 920, the method receives and processes the speed data 754 from the speed sensor 36 to determine an airspeed of the aircraft 12. At 922, the method retrieves the speed threshold 727 from the threshold datastore 704 and determines whether the airspeed of the aircraft 12 from the speed data 754 is less than the speed threshold 727. If true, the method proceeds to 924. Otherwise, the method loops to 920.

At 924, the method receives and processes the input data 714 from the human-machine interface 16. At 926, the method determines, based on the input data 714, whether the shutdown command 716 is received. If true, the method proceeds to 928. Otherwise, the method loops to 924.

At 928, the method receives and processes the temperature data 732 from the temperature sensor 38. At 930, the method retrieves the temperature threshold 726 from the threshold datastore 704 and determines whether the determined observed temperature from the temperature sensor 38 is less than the temperature threshold 726. If true, the method proceeds to 932. Otherwise, the method loops to 928.

At 932, the method outputs the stow control signals 746 to the actuators 140 to move the transcowl 118, and thus, the thrust reverser assembly 14, to the first, stowed position and sets the start time 739 command for the timer module 710.

At 934, the method receives and processes the resistance data 728 from the resistance sensors 40. At 936, the method retrieves the resistance threshold 722 from the threshold datastore 704 and determines, based on the observed rate of motion of the transcowl 118, whether the observed rate of motion of the transcowl 118 determined from the resistance data 728 is less than the resistance threshold 722. In one example, the method retrieves the travel distance 725 from the threshold datastore and determines an observed displacement or distance traveled by the transcowl 118 relative to the wall 118.7 of the support structure 116. The method determines the observed rate of motion of the transcowl 118 based on dividing the observed distanced traveled by the time of motion 729. The method compares the observed rate of motion of the transcowl 118 to the resistance threshold 722. If the transcowl 118 is moving at a rate of motion that is less than the resistance threshold 722, the method proceeds to 938. Otherwise, if false, the method proceeds to 937. At 937, the method determines whether the transcowl 118 of the thrust reverser assembly 14 is in the first, stowed position. In one example, the method receives and processes the position data 742 from the position sensors 42 and determines whether the transcowl 118 is in the first, stowed position based on the position data 742. If true, the method ends at 940. If false, the method loops to 936.

At 938, the method outputs the stop control signals to the actuators 140 to stop the movement of the transcowl 118 and sets the reset 736 to the timer module 710 to set the time T equal to zero. At 942, the method outputs the partial deploy control signals 748 to the actuators 140 to move the transcowl 118 to the partially deployed position. At 944, the method receives and processes the input data 714. At 946, the method determines, based on the input data 714, whether the pilot stow command 720 has been received. If true, the method proceeds to 932. Otherwise, at 948, the method retrieves the time threshold 724 from the threshold datastore 704 and determines whether the timer data 738 from the timer module 710 is greater than the time threshold 724. If true, the method proceeds to 932. Otherwise, the method loops to 944.

Figure 18:
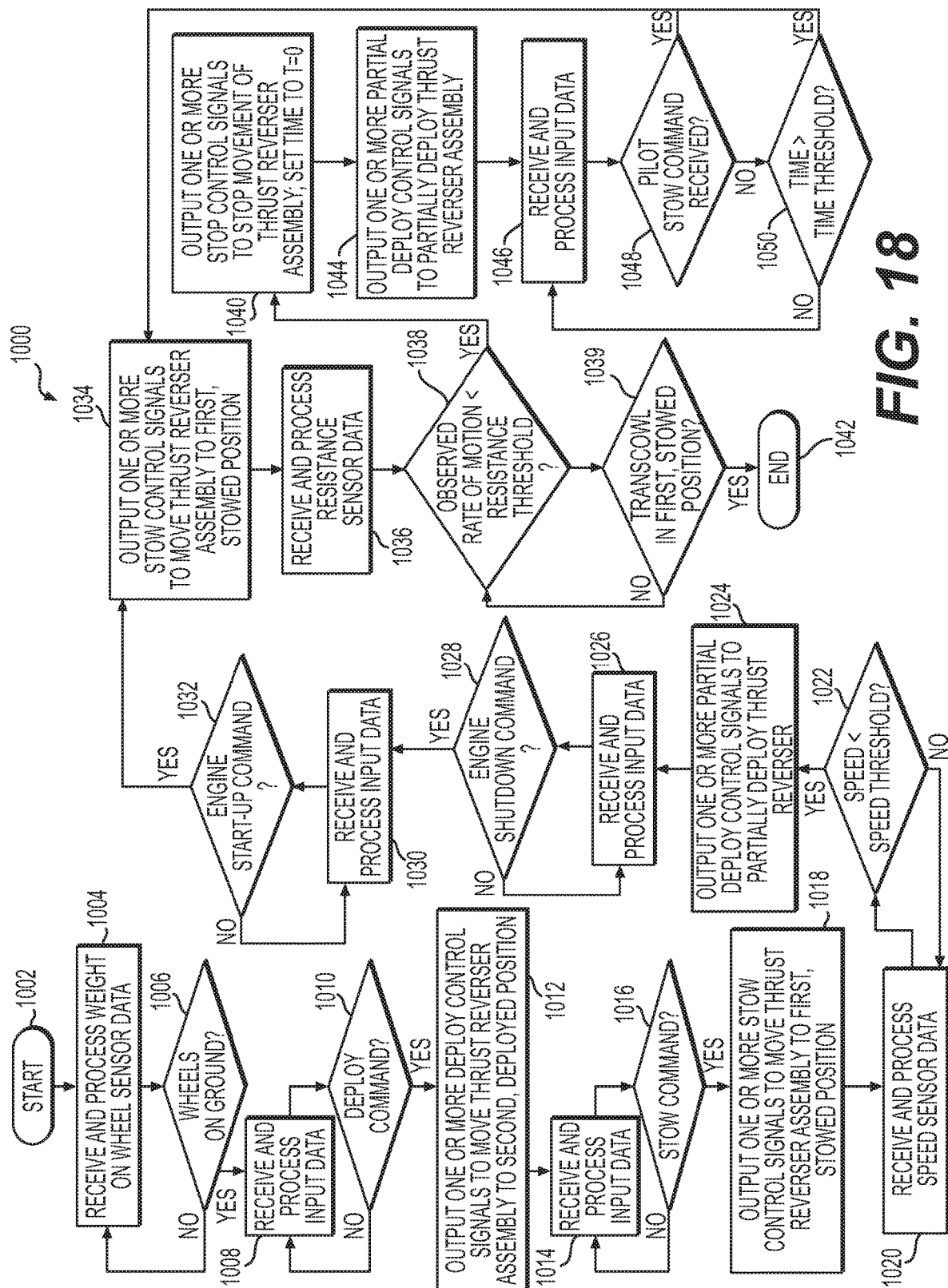
FIG. 18 is a flowchart illustrating another exemplary control method for the thrust reverser system of FIG. 1, in accordance with various embodiments.

Referring now to FIG. 18, and with continued reference to FIGS. 1-5 and 14, a flowchart illustrates a control method 1000 that can be performed by the thrust reverser system 10 of FIGS. 1-5 and 14 in accordance with the present disclosure. In various embodiments, the control method 1000 is performed by the processor 44 of the controller 20. As can be appreciated in light of the disclosure, the order of operation within the method is not limited to the sequential execution as illustrated in FIG. 18, but may be performed in one or more varying orders as applicable and in accordance with the present disclosure. In various embodiments, the method 1000 can be scheduled to run based on one or more predetermined events, and/or can run continuously during operation of the aircraft 12.

In one example, the method begins at 1002. At 1004, the method receives and processes the WOW data 740 to determine whether the aircraft 12 is on the ground. At 1006, the method determines, based on the WOW data 740, whether the wheels of the landing gear associated with the aircraft 12 are on the ground. If true, the method proceeds to 1008. Otherwise, the method loops to 1004.

At 1008, the method receives and processes the input data 714 from the human-machine interface 16. At 1010, the method determines, based on the input data 714, whether the deploy command 721 is received. If true, the method proceeds to 1012. Otherwise, the method loops to 1008.

At 1012, the method outputs the deploy control signals 749 to the actuators 140 to move the transcowl 118, and thus, the thrust reverser assembly 14, to the second, deployed position (FIGS. 3 and 5) to generate reverse thrust. At 1014, the method receives and processes the input data 714 from the human-machine interface 16. At 1016, the method determines, based on the input data 714, whether the pilot stow command 720 is received. If true, the method proceeds to 1018. Otherwise, the method loops to 1014.

At 1018, the method outputs the stow control signals 746 to the actuators 140 to move the transcowl 118, and thus, the thrust reverser assembly 14, to the first, stowed position (FIG. 2). At 1020, the method receives and processes the speed data 754 from the speed sensor 36 to determine an airspeed of the aircraft 12. At 1022, the method retrieves the speed threshold 727 from the threshold datastore 704 and determines whether the airspeed of the aircraft 12 from the speed data 754 is less than the speed threshold 727. If true, the method proceeds to 1024. Otherwise, the method loops to 1020.

At 1024, the method outputs the partial deploy control signals 748 to the actuators 140 to move the transcowl 118, and thus, the thrust reverser assembly 14, to the partially deployed position (FIG. 17) to manage idle thrust. At 1026, the method receives and processes the input data 714 from the human-machine interface 16. At 1028, the method determines, based on the input data 714, whether the shutdown command 716 is received. If true, the method proceeds to 1030. Otherwise, the method loops to 1026.

At 1030, the method receives and processes the input data 714 from the human-machine interface 16. At 1032, the method determines, based on the input data 714, whether a start-up command 718 has been received. If true, the method proceeds to 1034. Otherwise, the method loops to 1030.

At 1034, the method outputs the stow control signals to the actuators 140 to move the transcowl 118, and thus, the thrust reverser assembly 14, to the first, stowed position (FIGS. 2 and 4) and sets the start time 739 command for the timer module 710. At 1036, the method receives and processes the resistance data 728 from the resistance sensors 40. At 1038, the method retrieves the resistance threshold 722 from the threshold datastore 704 and determines, based on the observed rate of motion of the transcowl 118, whether the observed rate of motion of the transcowl 118 determined from the resistance data 728 is less than the resistance threshold 722. In one example, the method retrieves the travel distance 725 from the threshold datastore and determines an observed displacement or distance traveled by the transcowl 118 relative to the wall 118.7 of the support structure 116. The method determines the observed rate of motion of the transcowl 118 based on dividing the observed distanced traveled by the time of motion 729. The method compares the observed rate of motion of the transcowl 118 to the resistance threshold 722. If the transcowl 118 is moving at a rate of motion that is less than the resistance threshold 722, the method proceeds to 1040. Otherwise, if false, the method proceeds to 1039. At 1039, the method determines whether the transcowl 118 of the thrust reverser assembly 14 is in the first, stowed position. In one example, the method receives and processes the position data 742 from the position sensors 42 and determines whether the transcowl 118 is in the first, stowed position based on the position data 742. If true, the method ends at 1042. If false, the method loops to 1038.

At 1040, the method outputs the stop control signals to the actuators 140 to stop the movement of the transcowl 118 and sets the reset 736 to the timer module 710 to set the time T equal to zero. At 1044, the method outputs the partial deploy control signals 748 to the actuators 140 to move the transcowl 118 to the partially deployed position. At 1046, the method receives and processes the input data 714. At 1048, the method determines, based on the input data 714, whether the pilot stow command 720 has been received. If true, the method proceeds to 1034. Otherwise, at 1050, the method retrieves the time threshold 724 from the threshold datastore 704 and determines whether the timer data 738 from the timer module 710 is greater than the time threshold 724. If true, the method proceeds to 1034. Otherwise, the method loops to 1046.

Figure 19:
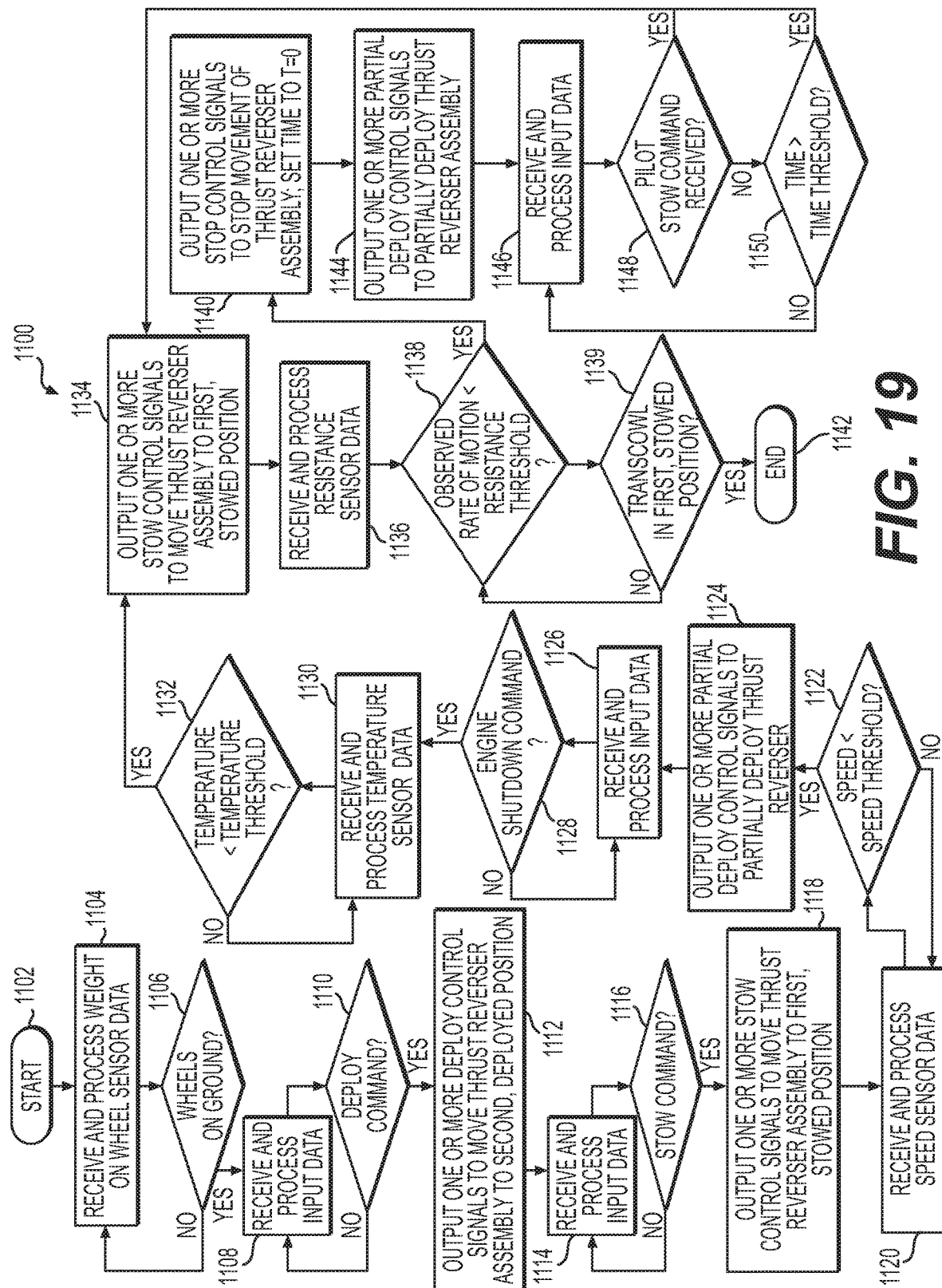
FIG. 19 is a flowchart illustrating another exemplary control method for the thrust reverser system of FIG. 1, in accordance with various embodiments.

Referring now to FIG. 19, and with continued reference to FIGS. 1-5 and 14, a flowchart illustrates a control method 1100 that can be performed by the thrust reverser system 10 of FIGS. 1-5 and 14 in accordance with the present disclosure. In various embodiments, the control method 1100 is performed by the processor 44 of the controller 20. As can be appreciated in light of the disclosure, the order of operation within the method is not limited to the sequential execution as illustrated in FIG. 18, but may be performed in one or more varying orders as applicable and in accordance with the present disclosure. In various embodiments, the method 1100 can be scheduled to run based on one or more predetermined events, and/or can run continuously during operation of the aircraft 12.

In one example, the method begins at 1102. At 1104, the method receives and processes the WOW data 740 to determine whether the aircraft 12 is on the ground. At 1106, the method determines, based on the WOW data 740, whether the wheels of the landing gear associated with the aircraft 12 are on the ground. If true, the method proceeds to 1108. Otherwise, the method loops to 1104.

At 1108, the method receives and processes the input data 714 from the human-machine interface 16. At 1110, the method determines, based on the input data 714, whether the deploy command 721 is received. If true, the method proceeds to 1112. Otherwise, the method loops to 1108.

At 1112, the method outputs the deploy control signals 749 to the actuators 140 to move the transcowl 118, and thus, the thrust reverser assembly 14, to the second, deployed position (FIGS. 3 and 5) to generate reverse thrust. At 1114, the method receives and processes the input data 714 from the human-machine interface 16. At 1116, the method determines, based on the input data 714, whether the pilot stow command 720 is received. If true, the method proceeds to 1118. Otherwise, the method loops to 1114.

At 1118, the method outputs the stow control signals 746 to the actuators 140 to move the transcowl 118, and thus, the thrust reverser assembly 14, to the first, stowed position (FIG. 2). At 1120, the method receives and processes the speed data 754 from the speed sensor 36 to determine an airspeed of the aircraft 12. At 1122, the method retrieves the speed threshold 727 from the threshold datastore 704 and determines whether the airspeed of the aircraft 12 from the speed data 754 is less than the speed threshold 727. If true, the method proceeds to 1124. Otherwise, the method loops to 1120.

At 1124, the method outputs the partial deploy control signals 748 to the actuators 140 to move the transcowl 118, and thus, the thrust reverser assembly 14, to the partially deployed position (FIG. 17) to manage idle thrust. At 1126, the method receives and processes the input data 714 from the human-machine interface 16. At 1128, the method determines, based on the input data 714, whether the shutdown command 716 is received. If true, the method proceeds to 1130. Otherwise, the method loops to 1126.

At 1130, the method receives and processes the temperature data 732 from the temperature sensor 38. At 1132, the method retrieves the temperature threshold 726 from the threshold datastore 704 and determines whether the determined observed temperature from the temperature sensor 38 is less than the temperature threshold 726. If true, the method proceeds to 1134. Otherwise, the method loops to 1130.

At 1134, the method outputs the stow control signals 746 to the actuators 140 to move the transcowl 118, and thus, the thrust reverser assembly 14, to the first, stowed position and sets the start time 739 command for the timer module 710. At 1136, the method receives and processes the resistance data 728 from the resistance sensors 40. At 1138, the method retrieves the resistance threshold 722 from the threshold datastore 704 and determines, based on the observed rate of motion of the transcowl 118, whether the observed rate of motion of the transcowl 118 determined from the resistance data 728 is less than the resistance threshold 722. In one example, the method retrieves the travel distance 725 from the threshold datastore and determines an observed displacement or distance traveled by the transcowl 118 relative to the wall 118.7 of the support structure 116. The method determines the observed rate of motion of the transcowl 118 based on dividing the observed distanced traveled by the time of motion 729. The method compares the observed rate of motion of the transcowl 118 to the resistance threshold 722. If the transcowl 118 is moving at a rate of motion that is less than the resistance threshold 722, the method proceeds to 1140. Otherwise, if false, the method proceeds to 1139. At 1139, the method determines whether the transcowl 118 of the thrust reverser assembly 14 is in the first, stowed position. In one example, the method receives and processes the position data 742 from the position sensors 42 and determines whether the transcowl 118 is in the first, stowed position based on the position data 742. If true, the method ends at 1142. If false, the method loops to 1138.

At 1140, the method outputs the stop control signals to the actuators 140 to stop the movement of the transcowl 118 and sets the reset 736 to the timer module 710 to set the time T equal to zero. At 1144, the method outputs the partial deploy control signals 748 to the actuators 140 to move the transcowl 118 to the partially deployed position. At 1146, the method receives and processes the input data 714. At 1148, the method determines, based on the input data 714, whether the pilot stow command 720 has been received. If true, the method proceeds to 1134. Otherwise, at 1150, the method retrieves the time threshold 724 from the threshold datastore 704 and determines whether the timer data 738 from the timer module 710 is greater than the time threshold 724. If true, the method proceeds to 1134. Otherwise, the method loops to 1146.

Figure 20:
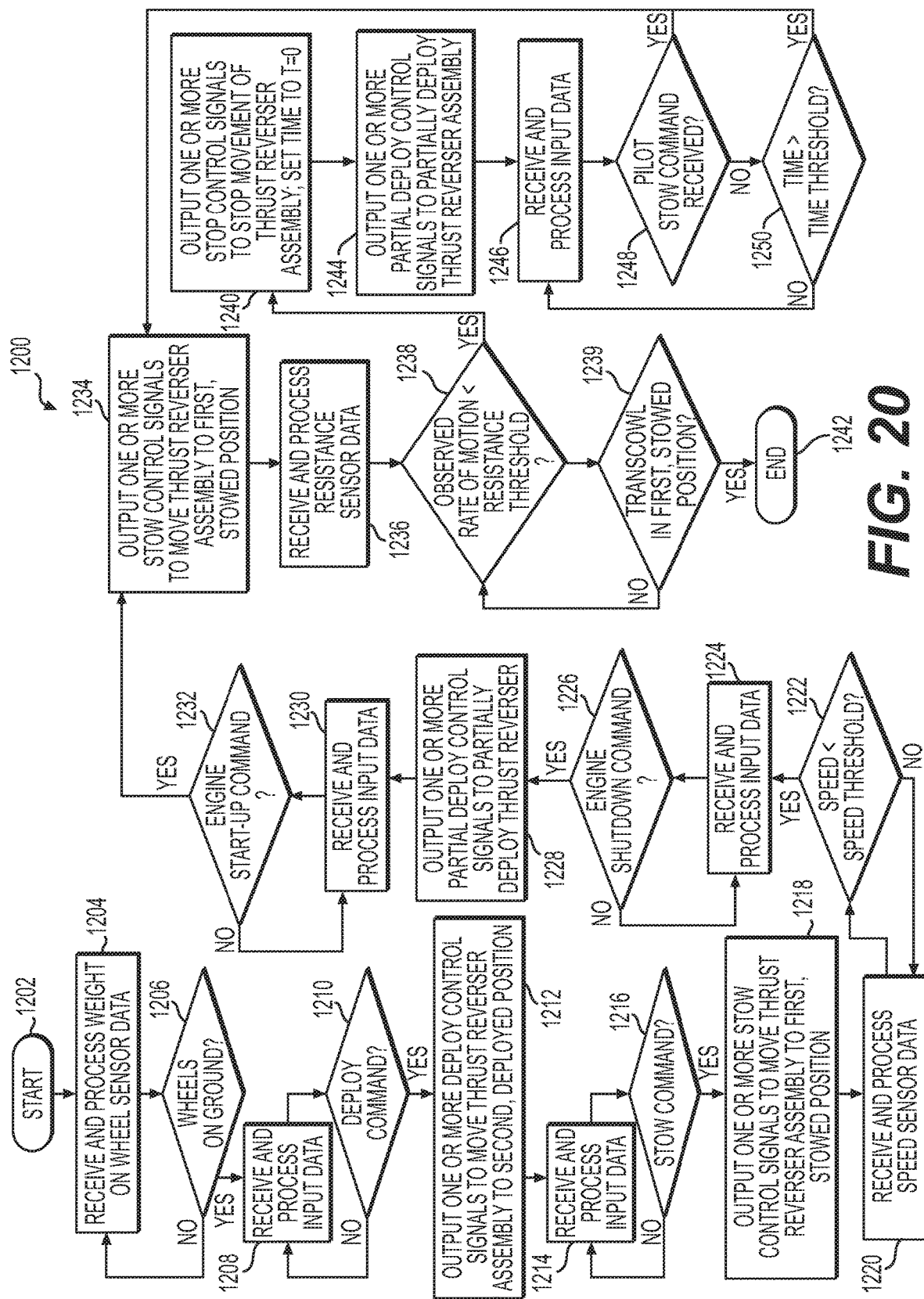
FIG. 20 is a flowchart illustrating another exemplary control method for the thrust reverser system of FIG. 1, in accordance with various embodiments.

Referring now to FIG. 20, and with continued reference to FIGS. 1-5 and 14, a flowchart illustrates a control method 1200 that can be performed by the thrust reverser system 10 of FIGS. 1-5 and 14 in accordance with the present disclosure. In various embodiments, the control method 1200 is performed by the processor 44 of the controller 20. As can be appreciated in light of the disclosure, the order of operation within the method is not limited to the sequential execution as illustrated in FIG. 20, but may be performed in one or more varying orders as applicable and in accordance with the present disclosure. In various embodiments, the method 1200 can be scheduled to run based on one or more predetermined events, and/or can run continuously during operation of the aircraft 12.

In one example, the method begins at 1202. At 1204, the method receives and processes the WOW data 740 to determine whether the aircraft 12 is on the ground. At 1206, the method determines, based on the WOW data 740, whether the wheels of the landing gear associated with the aircraft 12 are on the ground. If true, the method proceeds to 1208. Otherwise, the method loops to 1204.

At 1208, the method receives and processes the input data 714 from the human-machine interface 16. At 1210, the method determines, based on the input data 714, whether the deploy command 721 is received. If true, the method proceeds to 1212. Otherwise, the method loops to 1208.

At 1212, the method outputs the deploy control signals 749 to the actuators 140 to move the transcowl 118, and thus, the thrust reverser assembly 14, to the second, deployed position (FIGS. 3 and 5) to generate reverse thrust. At 1214, the method receives and processes the input data 714 from the human-machine interface 16. At 1216, the method determines, based on the input data 714, whether the pilot stow command 720 is received. If true, the method proceeds to 1218. Otherwise, the method loops to 1214.

At 1218, the method outputs the stow control signals 746 to the actuators 140 to move the transcowl 118, and thus, the thrust reverser assembly 14, to the first, stowed position (FIG. 2). At 1220, the method receives and processes the speed data 754 from the speed sensor 36 to determine an airspeed of the aircraft 12. At 1222, the method retrieves the speed threshold 727 from the threshold datastore 704 and determines whether the airspeed of the aircraft 12 from the speed data 754 is less than the speed threshold 727. If true, the method proceeds to 1224. Otherwise, the method loops to 1220.

At 1224, the method receives and processes the input data 714 from the human-machine interface 16. At 1226, the method determines, based on the input data 714, whether the shutdown command 716 is received. If true, the method proceeds to 1228. Otherwise, the method loops to 1224. At 1228, the method outputs the partial deploy control signals 748 to the actuators 140 to move the transcowl 118, and thus, the thrust reverser assembly 14, to the partially deployed position (FIG. 17) to enable hot gases to vent through the transcowl 118 and to enable liquids to drain from the transcowl 118. At 1230, the method receives and processes the input data 714 from the human-machine interface 16. At 1232, the method determines, based on the input data 714, whether a start-up command 718 has been received. If true, the method proceeds to 1234. Otherwise, the method loops to 1230.

At 1234, the method outputs the stow control signals to the actuators 140 to move the transcowl 118, and thus, the thrust reverser assembly 14, to the first, stowed position (FIGS. 2 and 4) and sets the start time 739 command for the timer module 710. At 1236, the method receives and processes the resistance data 728 from the resistance sensors 40. At 1238, the method retrieves the resistance threshold 722 from the threshold datastore 704 and determines, based on the observed rate of motion of the transcowl 118, whether the observed rate of motion of the transcowl 118 determined from the resistance data 728 is less than the resistance threshold 722. In one example, the method retrieves the travel distance 725 from the threshold datastore and determines an observed displacement or distance traveled by the transcowl 118 relative to the wall 118.7 of the support structure 116. The method determines the observed rate of motion of the transcowl 118 based on dividing the observed distanced traveled by the time of motion 729. The method compares the observed rate of motion of the transcowl 118 to the resistance threshold 722. If the transcowl 118 is moving at a rate of motion that is less than the resistance threshold 722, the method proceeds to 1240. Otherwise, if false, the method proceeds to 1239. At 1239, the method determines whether the transcowl 118 of the thrust reverser assembly 14 is in the first, stowed position. In one example, the method receives and processes the position data 742 from the position sensors 42 and determines whether the transcowl 118 is in the first, stowed position based on the position data 742. If true, the method ends at 1242. If false, the method loops to 1238.

At 1240, the method outputs the stop control signals to the actuators 140 to stop the movement of the transcowl 118 and sets the reset 736 to the timer module 710 to set the time T equal to zero. At 1244, the method outputs the partial deploy control signals 748 to the actuators 140 to move the transcowl 118 to the partially deployed position. At 1246, the method receives and processes the input data 714. At 1248, the method determines, based on the input data 714, whether the pilot stow command 720 has been received. If true, the method proceeds to 1234. Otherwise, at 1250, the method retrieves the time threshold 724 from the threshold datastore 704 and determines whether the timer data 738 from the timer module 710 is greater than the time threshold 724. If true, the method proceeds to 1234. Otherwise, the method loops to 1246.

Figure 21:
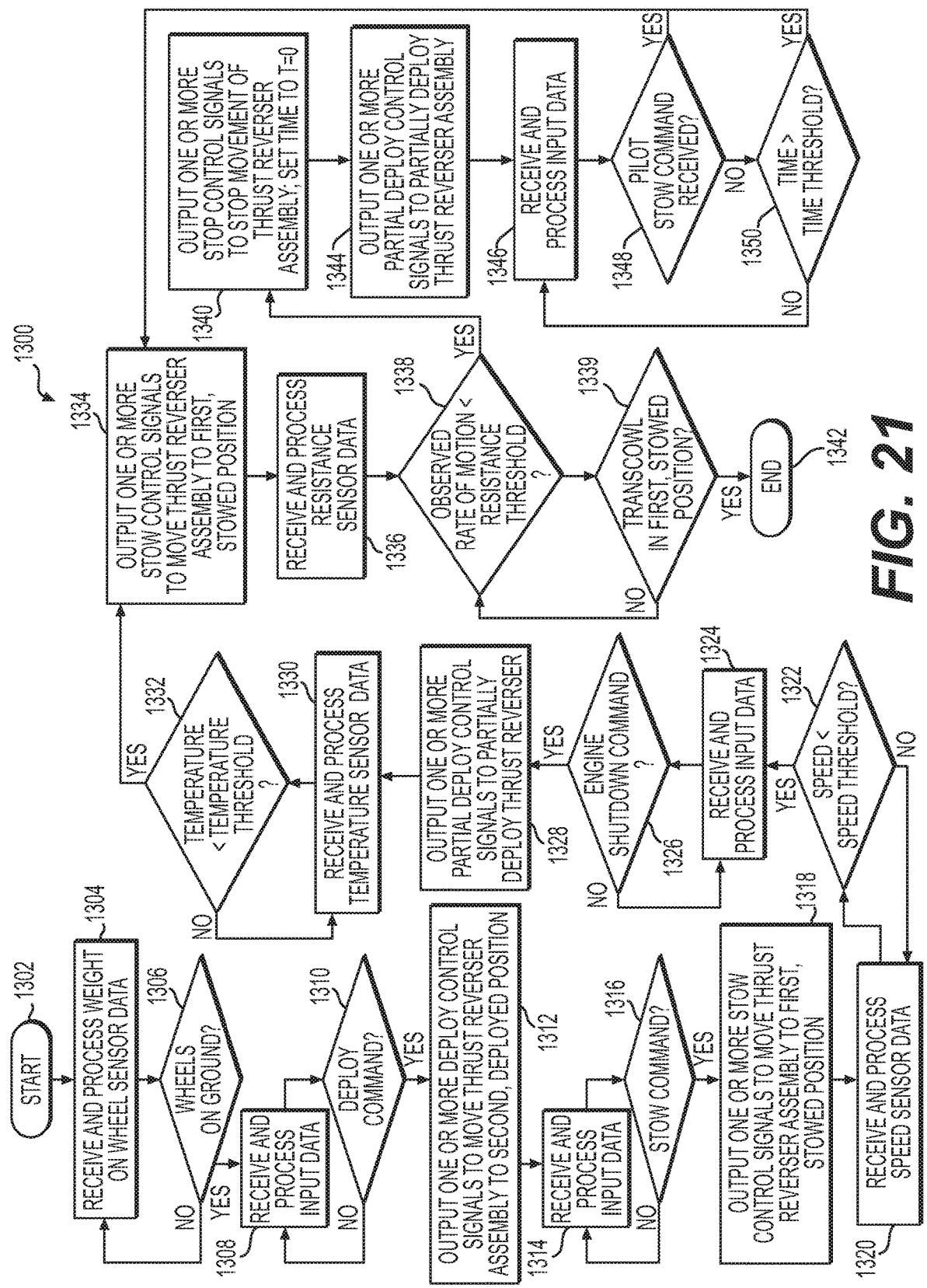
FIG. 21 is a flowchart illustrating another exemplary control method for the thrust reverser system of FIG. 1, in accordance with various embodiments.

Referring now to FIG. 21, and with continued reference to FIGS. 1-5 and 14, a flowchart illustrates a control method 1300 that can be performed by the thrust reverser system 10 of FIGS. 1-5 and 14 in accordance with the present disclosure. In various embodiments, the control method 1300 is performed by the processor 44 of the controller 20. As can be appreciated in light of the disclosure, the order of operation within the method is not limited to the sequential execution as illustrated in FIG. 21, but may be performed in one or more varying orders as applicable and in accordance with the present disclosure. In various embodiments, the method 1300 can be scheduled to run based on one or more predetermined events, and/or can run continuously during operation of the aircraft 12.

In one example, the method begins at 1302. At 1304, the method receives and processes the WOW data 740 to determine whether the aircraft 12 is on the ground. At 1306, the method determines, based on the WOW data 740, whether the wheels of the landing gear associated with the aircraft 12 are on the ground. If true, the method proceeds to 1308. Otherwise, the method loops to 1304.

At 1308, the method receives and processes the input data 714 from the human-machine interface 16. At 1310, the method determines, based on the input data 714, whether the deploy command 721 is received. If true, the method proceeds to 1312. Otherwise, the method loops to 1308.

At 1312, the method outputs the deploy control signals 749 to the actuators 140 to move the transcowl 118, and thus, the thrust reverser assembly 14, to the second, deployed position (FIGS. 3 and 5). At 1314, the method receives and processes the input data 714 from the human-machine interface 16. At 1316, the method determines, based on the input data 714, whether the pilot stow command 720 is received. If true, the method proceeds to 1318. Otherwise, the method loops to 1314.

At 1318, the method outputs the stow control signals 746 to the actuators 140 to move the transcowl 118, and thus, the thrust reverser assembly 14, to the first, stowed position (FIG. 2). At 1320, the method receives and processes the speed data 754 from the speed sensor 36 to determine an airspeed of the aircraft 12. At 1322, the method retrieves the speed threshold 727 from the threshold datastore 704 and determines whether the airspeed of the aircraft 12 from the speed data 754 is less than the speed threshold 727. If true, the method proceeds to 1324. Otherwise, the method loops to 1320.

At 1324, the method receives and processes the input data 714 from the human-machine interface 16. At 1326, the method determines, based on the input data 714, whether the shutdown command 716 is received. If true, the method proceeds to 1328. Otherwise, the method loops to 1224. At 1328, the method outputs the partial deploy control signals 748 to the actuators 140 to move the transcowl 118, and thus, the thrust reverser assembly 14, to the partially deployed position (FIG. 17) to enable hot gases to vent through the transcowl 118 and to enable liquids to drain from the transcowl 118.

At 1330, the method receives and processes the temperature data 732 from the temperature sensor 38. At 1332, the method retrieves the temperature threshold 726 from the threshold datastore 704 and determines whether the determined observed temperature from the temperature sensor 38 is less than the temperature threshold 726. If true, the method proceeds to 1334. Otherwise, the method loops to 1330.

At 1334, the method outputs the stow control signals 746 to the actuators 140 to move the transcowl 118, and thus, the thrust reverser assembly 14, to the first, stowed position and sets the start time 739 command for the timer module 710. At 1336, the method receives and processes the resistance data 728 from the resistance sensors 40. At 1138, the method retrieves the resistance threshold 722 from the threshold datastore 704 and determines, based on the observed rate of motion of the transcowl 118, whether the observed rate of motion of the transcowl 118 determined from the resistance data 728 is less than the resistance threshold 722. In one example, the method retrieves the travel distance 725 from the threshold datastore and determines an observed displacement or distance traveled by the transcowl 118 relative to the wall 118.7 of the support structure 116. The method determines the observed rate of motion of the transcowl 118 based on dividing the observed distanced traveled by the time of motion 729. The method compares the observed rate of motion of the transcowl 118 to the resistance threshold 722. If the transcowl 118 is moving at a rate of motion that is less than the resistance threshold 722, the method proceeds to 1340. Otherwise, if false, the method proceeds to 1339. At 1339, the method determines whether the transcowl 118 of the thrust reverser assembly 14 is in the first, stowed position. In one example, the method receives and processes the position data 742 from the position sensors 42 and determines whether the transcowl 118 is in the first, stowed position based on the position data 742. If true, the method ends at 1342. If false, the method loops to 1338.

At 1340, the method outputs the stop control signals to the actuators 140 to stop the movement of the transcowl 118 and sets the reset 736 to the timer module 710 to set the time T equal to zero. At 1344, the method outputs the partial deploy control signals 748 to the actuators 140 to move the transcowl 118 to the partially deployed position. At 1346, the method receives and processes the input data 714. At 1348, the method determines, based on the input data 714, whether the pilot stow command 720 has been received. If true, the method proceeds to 1334. Otherwise, at 1350, the method retrieves the time threshold 724 from the threshold datastore 704 and determines whether the timer data 738 from the timer module 710 is greater than the time threshold 724. If true, the method proceeds to 1334. Otherwise, the method loops to 1346.

Thus, the vent 122 and the assemblies 500, 600 (when employed as a vent) enable hot gases to vent from the thrust reverser assembly 14, thereby reducing a temperature experienced by the thrust reverser assembly 14. By reducing the temperature experienced by the thrust reverser assembly 14, the transcowl 118 and other components associated with the thrust reverser assembly 14 may be made out of different, lower cost and lighter materials. Moreover, the drain 124 and the assemblies 500, 600 (when used as a drain), reduce the accumulation of fluids within the transcowl 118 and/or the gas turbine engine 22, which reduces a potential for corrosion within the thrust reverser assembly 14 and/or the gas turbine engine 22. In addition, by controlling the actuators 140 to move the transcowl 118 to the partially deployed position, the thrust reverser assembly 14 also experiences lower operating temperatures, which also enables the use of different, lower cost and lighter materials. Further, the control of the actuators 140 to move the transcowl 118 to the partially deployed position also reduces the accumulation of fluids within the transcowl 118 and/or the gas turbine engine 22, which reduces a potential for corrosion within the thrust reverser assembly 14 and/or the gas turbine engine 22 by enabling the fluids to exit the transcowl 118 when the transcowl 118 is in the partially deployed position. The movement of the transcowl 118 to the partially deployed position also provides for idle thrust management.

It should be noted that power for the control system 700 when the gas turbine engine 22 and/or aircraft 12 is not operating may be provided from an electrical capacitor, a hydraulic accumulator, one or more batteries associated with the aircraft 12 (or other energy storage device associated with the aircraft 12 or gas turbine engine 22), an aircraft shore power connection and/or the auxiliary power unit (APU) associated with the aircraft 12.

Further, it should be noted that the controller 20 may output one or more notifications to the display 32 to inform the pilot or user of a position of the transcowl 118 and/or the thrust reverser assembly 14 based on the position data 742, for example. The controller 20 may also output one or more notifications to inform the pilot or user that the transcowl 118 and/or the thrust reverser assembly 14 has encountered resistance, and will be moving back to the partially deployed position.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A thrust reverser system for a gas turbine engine, comprising:
    a transcowl movable between a first, stowed position, a second, deployed position and a partially deployed position between the first, stowed position and the second, deployed position by at least one actuator, and in the partially deployed position the transcowl defines at least one opening;
    a temperature sensor that observes a temperature associated with the thrust reverser system and generates temperature sensor signals based on the temperature observation;
    at least one resistance sensor that observes a displacement of the transcowl and generates resistance sensor signals based on the displacement observation; and
    a controller, having a processor, that:
        outputs one or more control signals to the at least one actuator to move the transcowl to the partially deployed position;
        receives and processes the temperature sensor signals to determine whether a temperature associated with the transcowl exceeds a temperature threshold;
        based on the determination that the temperature is below the temperature threshold, outputs one or more control signals to the at least one actuator to move the transcowl from the partially deployed position to the first, stowed position;
        receives and processes the resistance sensor signals from the at least one resistance sensor to determine whether the transcowl has encountered resistance; and
        based on the determination that the transcowl has encountered resistance, outputs one or more control signals to the at least one actuator to stop a movement of the transcowl and outputs the one or more control signals to move the transcowl to the partially deployed position.

2. The thrust reverser system of claim 1, wherein the gas turbine engine is onboard an aircraft and the thrust reverser system further comprises a weight on wheels sensor that generates weight on wheels sensor signals, and the controller receives and processes the weight on wheels sensor signals to determine whether the aircraft is on the ground prior to the output of the one or more control signals to the at least one actuator to move the transcowl to the partially deployed position.

3. The thrust reverser system of claim 1, further comprising:
    a source of user input that is a command to deploy the transcowl, and based on the command to deploy the transcowl, the controller outputs one or more control signals to the at least one actuator to move the transcowl to the second, deployed position; and
    a source of user input that is a command to stow the transcowl, and based on the command to stow the transcowl, the controller outputs one or more control signals to the at least one actuator to move the transcowl to the first, stowed position prior to the output of the one or more control signals to the at least one actuator to move the transcowl to the partially deployed position.

4. The thrust reverser system of claim 1, further comprising:
a source of user input that is a command to deploy the transcowl, and based on the command to deploy the transcowl, the controller outputs one or more control signals to the at least one actuator to move the transcowl to the second, deployed position; and
a source of user input that is a command to stow the transcowl, and based on the command to stow the transcowl, the controller outputs the one or more control signals to the at least one actuator to move the transcowl to the partially deployed position.

5. The thrust reverser system of claim 1, further comprising a source of user input that is a command to shutdown the gas turbine engine, and based on the command to shutdown the gas turbine engine, the controller outputs the one or more control signals to the at least one actuator to move the transcowl to the partially deployed position.

6. The thrust reverser system of claim 1, wherein the gas turbine engine is onboard an aircraft and the controller receives and processes speed sensor signals from a speed sensor associated with the aircraft to determine a speed of the aircraft, and based on the speed of the aircraft, the controller outputs the one or more control signals to the at least one actuator to move the transcowl to the partially deployed position.

7. A thrust reverser system for a gas turbine engine, comprising:
a transcowl movable between a first, stowed position, a second, deployed position and a partially deployed position between the first, stowed position and the second, deployed position by at least one actuator, and in the partially deployed position the transcowl defines at least one opening;
a source of a user input that is a command to start-up the gas turbine engine;
at least one resistance sensor that observes a displacement of the transcowl and generates resistance sensor signals based on the observation; and
a controller, having a processor, that:
outputs one or more control signals to the at least one actuator to move the transcowl to the partially deployed position;
receives the user input, and based on the user input, outputs one or more control signals to the at least one actuator to move the transcowl to the first, stowed position;
receives and processes the resistance sensor signals from the at least one resistance sensor to determine whether the transcowl has encountered resistance; and
based on the determination that the transcowl has encountered resistance, outputs one or more control signals to the at least one actuator to stop a movement of the transcowl and outputs the one or more control signals to move the transcowl to the partially deployed position.

8. The thrust reverser system of claim 7, wherein the gas turbine engine is onboard an aircraft and the thrust reverser system further comprises a weight on wheels sensor that generates weight on wheels sensor signals, and the controller receives and processes the weight on wheels sensor signals to determine whether the aircraft is on the ground prior to the output of the one or more control signals to the at least one actuator to move the transcowl to the partially deployed position.

9. The thrust reverser system of claim 7, further comprising:
a source of user input that is a command to deploy the transcowl, and based on the command to deploy the transcowl, the controller outputs one or more control signals to the at least one actuator to move the transcowl to the second, deployed position; and
a source of user input that is a command to stow the transcowl, and based on the command to stow the transcowl, the controller outputs one or more control signals to the at least one actuator to move the transcowl to the first, stowed position prior to the output of the one or more control signals to the at least one actuator to move the transcowl to the partially deployed position.

10. The thrust reverser system of claim 7, further comprising:
a source of user input that is a command to deploy the transcowl, and based on the command to deploy the transcowl, the controller outputs one or more control signals to the at least one actuator to move the transcowl to the second, deployed position; and
a source of user input that is a command to stow the transcowl, and based on the command to stow the transcowl, the controller outputs the one or more control signals to the at least one actuator to move the transcowl to the partially deployed position.

11. The thrust reverser system of claim 7, further comprising a source of user input that is a command to shutdown the gas turbine engine, and based on the command to shutdown the gas turbine engine, the controller outputs the one or more control signals to the at least one actuator to move the transcowl to the partially deployed position.

12. The thrust reverser system of claim 7, wherein the gas turbine engine is onboard an aircraft and the controller receives and processes speed sensor signals from a speed sensor associated with the aircraft to determine a speed of the aircraft, and based on the speed of the aircraft, the controller outputs the one or more control signals to the at least one actuator to move the transcowl to the partially deployed position.

13. A method for temperature and fluid management for a gas turbine engine having a thrust reverser, comprising:
outputting, by a processor, one or more control signals to at least one actuator associated with a transcowl to move the transcowl to a partially deployed position, the transcowl movable between a first, stowed position, a second, deployed position and the partially deployed position between the first, stowed position and the second, deployed position by the at least one actuator, and in the partially deployed position the transcowl defines at least one opening;
receiving, by the processor, temperature sensor signals from a temperature sensor that observes a temperature associated with the thrust reverser system;
determining, by the processor, based on the temperature sensor signals whether a temperature associated with the transcowl exceeds a temperature threshold;
based on the determination that the temperature is below the temperature threshold, outputting, by the processor, one or more control signals to the at least one actuator to move the transcowl from the partially deployed position to the first, stowed position;

receiving, by the processor, resistance sensor signals from at least one resistance sensor that observes a displacement of the transcowl;

determining, by the processor, based on the resistance sensor signals whether the transcowl has encountered resistance; and based on the determination that the transcowl has encountered resistance, outputting, by the processor, one or more control signals to the at least one actuator to stop a movement of the transcowl and outputting, by the processor, the one or more control signals to move the transcowl to the partially deployed position.

14. The method of claim 13, further comprising:

receiving, by the processor, weight on wheels sensor signals from a weight on wheels sensor associated with an aircraft; and determining, by the processor, whether the aircraft is on the ground prior to the outputting of the one or more control signals to the at least one actuator to move the transcowl to the partially deployed position.

15. The method of claim 13, further comprising:

receiving, by the processor, a source of user input that is a command to deploy the transcowl;

based on the command to deploy the transcowl, outputting, by the processor, one or more control signals to the at least one actuator to move the transcowl to the second, deployed position;

receiving, by the processor, a source of user input that is a command to stow the transcowl; and based on the command to stow the transcowl, outputting, by the processor, one or more control signals to the at least one actuator to move the transcowl to the first, stowed position prior to outputting of the one or more control signals to the at least one actuator to move the transcowl to the partially deployed position.

16. The method of claim 13, further comprising:

receiving, by the processor, a source of user input that is a command to deploy the transcowl;

based on the command to deploy the transcowl, outputting, by the processor, one or more control signals to the at least one actuator to move the transcowl to the second, deployed position;

receiving, by the processor, a source of user input that is a command to stow the transcowl; and based on the command to stow the transcowl, outputting, by the processor, the one or more control signals to the at least one actuator to move the transcowl to the partially deployed position.

17. The method of claim 13, further comprising:

receiving, by the processor, a source of user input that is a command to shutdown the gas turbine engine; and based on the command to shutdown the gas turbine engine, outputting, by the processor, the one or more control signals to the at least one actuator to move the transcowl to the partially deployed position.

18. The method of claim 13, further comprising:

receiving, by the processor, speed sensor signals from a speed sensor associated with an aircraft to determine a speed of the aircraft; and based on the speed of the aircraft, outputting, by the processor, the one or more control signals to the at least one actuator to move the transcowl to the partially deployed position.

* * * * *